US010931893B2

United States Patent
Ozone

(10) Patent No.: US 10,931,893 B2
(45) Date of Patent: Feb. 23, 2021

(54) IMAGE SENSOR, IMAGE PROCESSING APPARATUS AND METHOD, AND PROGRAM

(71) Applicant: Sony Corporation, Tokyo (JP)

(72) Inventor: Takayoshi Ozone, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/060,212

(22) PCT Filed: Nov. 30, 2016

(86) PCT No.: PCT/JP2016/085465
§ 371 (c)(1),
(2) Date: Jun. 7, 2018

(87) PCT Pub. No.: WO2017/104411
PCT Pub. Date: Jun. 22, 2017

(65) Prior Publication Data
US 2018/0367744 A1    Dec. 20, 2018

(30) Foreign Application Priority Data
Dec. 14, 2015  (JP) .............................. JP2015-242871

(51) Int. Cl.
*H04N 5/33* (2006.01)
*H04N 9/04* (2006.01)
*H04N 9/73* (2006.01)

(52) U.S. Cl.
CPC ......... *H04N 5/332* (2013.01); *H04N 9/04515* (2018.08); *H04N 9/04553* (2018.08); *H04N 9/735* (2013.01)

(58) Field of Classification Search
CPC ........... H04N 9/04515; H04N 9/04553; H04N 9/735; H04N 5/332
See application file for complete search history.

(56) References Cited

U.S. PATENT DOCUMENTS

2015/0138366 A1* 5/2015 Keelan .................... H04N 9/64
                                                            348/164
2015/0287766 A1* 10/2015 Kim ...................... H01L 27/307
                                                            250/208.1
(Continued)

FOREIGN PATENT DOCUMENTS

JP    2002-142228 A    5/2002
JP    2005-006066 A    1/2005
(Continued)

OTHER PUBLICATIONS

Written Opinion and English translation thereof dated Feb. 28, 2017 in connection with International Application No. PCT/JP2016/085465.
(Continued)

*Primary Examiner* — Neil R Mikeska
(74) *Attorney, Agent, or Firm* — Wolf, Greenfield & Sacks, P.C.

(57) ABSTRACT

The present technology relates to an image sensor, an image processing apparatus and method, and a program that enable a higher quality image to be obtained. An image processing apparatus includes: an extraction unit configured to, from a captured image having a first pixel having a first color component of visible light and an infrared component and a second pixel only having a second color component of visible light that is influenced by a color temperature more significantly than the first color component and less influences a luminance component than the first color component, extract the first pixel to generate an extracted infrared image; an infrared image generation unit configured to perform interpolation processing on the extracted infrared image to generate an infrared image; and a color image generation unit configured to generate a color image on a basis of a visible light low frequency image having a visible
(Continued)

light component obtained from the captured image, and the infrared image. The present technology can be applied to an image processing apparatus.

17 Claims, 12 Drawing Sheets

(56) References Cited

U.S. PATENT DOCUMENTS

| | | | |
|---|---|---|---|
| 2016/0154151 A1* | 6/2016 | Cha | G02B 5/201 |
| | | | 348/342 |
| 2016/0173790 A1* | 6/2016 | Ishihara | H04N 9/67 |
| | | | 348/164 |
| 2017/0134704 A1* | 5/2017 | Otsubo | G02B 5/20 |
| 2017/0280122 A1* | 9/2017 | Sato | H04N 9/07 |
| 2017/0287667 A1* | 10/2017 | Letexier | H01J 31/56 |
| 2017/0357881 A1* | 12/2017 | Hoshino | G06T 1/00 |

FOREIGN PATENT DOCUMENTS

| | | |
|---|---|---|
| JP | 2007-329380 A | 12/2007 |
| JP | 2008-283541 A | 11/2008 |
| JP | 2010-011415 A | 1/2010 |
| JP | 2011-233983 A | 11/2011 |

OTHER PUBLICATIONS

International Preliminary Report on Patentability and English translation thereof dated Jun. 28, 2018 in connection with International Application No. PCT/JP2016/085465.

International Search Report and English translation thereof dated Feb. 28, 2017 in connection with International Application No. PCT/JP2016/085465.

* cited by examiner

IMAGE SENSOR, IMAGE PROCESSING APPARATUS AND METHOD, AND PROGRAM

CROSS-REFERENCE TO RELATED APPLICATIONS

This application claims the benefit under 35 U.S.C. § 371 as a U.S. National Stage Entry of International Application No. PCT/JP2016/085465, filed in the Japanese Patent Office as a Receiving Office on Nov. 30, 2016, which claims priority to Japanese Patent Application Number JP2015-242871, filed in the Japanese Patent Office on Dec. 14, 2015, each of which is hereby incorporated by reference in its entirety.

TECHNICAL FIELD

The present technology relates to an image sensor, an image processing apparatus and method, and a program, and more particularly to an image sensor, an image processing apparatus and method, and a program that enable a higher quality image to be obtained.

BACKGROUND ART

For a monitoring camera, or the like, a technology is known that enables an infrared image to be obtained by emitting infrared light to a subject while retaining the quality of a color image of visible light (for example, see Patent Literature 1). Using this technology, it is possible to capture a color image of visible light in the daytime when there is much visible light, and to emit infrared light in the nighttime when there is little visible light to capture an infrared image.

For example, with such a technology, an image sensor is provided with a pixel that receives R (red) and IR (infrared) components, a pixel that receives G (green) and IR components, a pixel that receives B (blue) and IR components, and a pixel that only receives the IR component.

Accordingly, when capturing a color image, it is possible to improve color reproduction even with lighting at a low color temperature by subtracting the IR component from an output of each pixel that receives a visible light component. In addition, it is possible to emit infrared light in the nighttime to perform an exposure, and to obtain an infrared image from an output from a pixel that receives the IR component.

Further, a technology for emitting infrared light autonomously in the case where there is very little incoming light to obtain a color image has also been proposed (for example, see Patent Literature 2).

For example, with such a technology, emission of infrared light is turned on and off within one frame period, and an infrared image is captured while emission of infrared light is turned on, and a visible image is captured while emission of infrared light is turned off, and a color image is generated from those infrared image and visible image.

CITATION LIST

Patent Literature

Patent Literature 1: JP 2010-011415A
Patent Literature 2: JP 2011-233983A

DISCLOSURE OF INVENTION

Technical Problem

However, with the above-described technologies, it is difficult to obtain a sufficiently high quality image under an environment in which there are many infrared components, such as during a dark time, for example.

With the technology described in Patent Literature 1, for example, it is possible to obtain an infrared image when infrared light is emitted, but image colorization is not considered. Therefore, it is not possible to obtain a color image when infrared light is emitted.

In addition, with the technology described in Patent Literature 2, on and off of emission of infrared light is switched in the time direction so as not to be influenced by infrared light when capturing a visible image. Therefore, a lag occurs in capturing time between an infrared image and a visible image used for generating a color image, and the color image is reduced in quality.

Further, with the technology described in Patent Literature 2, since both of an infrared image and a visible image are captured within one frame period, the exposure times for those images are shortened. In particular, the exposure time with weak visible light, that is, the exposure time for a visible image becomes a half time of usual one frame period, and thus noise increases, and the color image is reduced in quality.

The present technology was made in view of such circumstances, and enables a higher quality image to be obtained.

Solution to Problem

An image processing apparatus according to a first aspect of the present technology includes: an extraction unit configured to, from a captured image having a first pixel having a first color component of visible light and an infrared component and a second pixel only having a second color component of visible light that is influenced by a color temperature more significantly than the first color component and less influences a luminance component than the first color component, extract the first pixel to generate an extracted infrared image; an infrared image generation unit configured to perform interpolation processing on the extracted infrared image to generate an infrared image; and a color image generation unit configured to generate a color image on a basis of a visible light low frequency image having a visible light component obtained from the captured image, and the infrared image.

The captured image can further have a third pixel only having an infrared component, and the extraction unit can extract the first pixel and the third pixel from the captured image to generate the extracted infrared image.

In a case where an output level of the first pixel and an output level of the third pixel are substantially equal, the infrared image generation unit can perform the interpolation processing on the extracted infrared image including the first pixel and the third pixel to generate the infrared image, and in the case where the output level of the first pixel and the output level of the third pixel are substantially equal, the color image generation unit can generate the color image on the basis of the visible light low frequency image and the infrared image.

The image processing apparatus can further include: a white balance adjustment unit configured to perform white balance adjustment on the extracted infrared image. The infrared image generation unit can perform the interpolation processing on the extracted infrared image having undergone the white balance adjustment to generate the infrared image.

The color image generation unit can synthesize the visible light low frequency image obtained by extracting the first pixel and the second pixel from the captured image and an infrared light high frequency image obtained by extracting a high frequency component from the infrared image to generate the color image.

The color image generation unit can synthesize the visible light low frequency image obtained by extracting the second pixel from the captured image and the infrared image to generate the color image.

A total number of the first pixels and the third pixels on the captured image can be larger than a number of the second pixels.

The first color component can be green, white, or yellow.

The second color component can be red or blue.

The image processing apparatus can further include: an imaging unit configured to capture the captured image.

An image processing method or a program according to the first aspect of the present technology includes steps of: from a captured image having a first pixel having a first color component of visible light and an infrared component and a second pixel only having a second color component of visible light that is influenced by a color temperature more significantly than the first color component and less influences a luminance component than the first color component, extracting the first pixel to generate an extracted infrared image; performing interpolation processing on the extracted infrared image to generate an infrared image; and generating a color image on a basis of a visible light low frequency image having a visible light component obtained from the captured image, and the infrared image.

In the first aspect of the present technology, from a captured image having a first pixel having a first color component of visible light and an infrared component and a second pixel only having a second color component of visible light that is influenced by a color temperature more significantly than the first color component and less influences a luminance component than the first color component, the first pixel is extracted and an extracted infrared image is generated, interpolation processing is performed on the extracted infrared image and an infrared image is generated, and a color image is generated on a basis of a visible light low frequency image having a visible light component obtained from the captured image, and the infrared image.

An image sensor according to a second aspect of the present technology includes: a first pixel configured to receive a first color component of visible light and an infrared component; and a second pixel configured to only receive a second color component of visible light that is influenced by a color temperature more significantly than the first color component and less influences a luminance component than the first color component.

The image sensor can further include: a third pixel configured to only receive an infrared component.

A total number of the first pixels and the third pixels can be larger than a number of the second pixels.

The first color component can be green, white, or yellow.

The second color component can be red or blue.

In the second aspect of the present technology, the image sensor is provided with a first pixel that receives a first color component of visible light and an infrared component, and a second pixel that only receives a second color component of visible light that is influenced by a color temperature more significantly than the first color component and less influences a luminance component than the first color component.

Advantageous Effects of Invention

According to the first aspect and the second aspect of the present technology, it is possible to obtain a higher quality image.

Further, the effects described herein are not necessarily limited, and any effect described in the present disclosure may be included.

MODE(S) FOR CARRYING OUT THE INVENTION

Hereinafter, embodiments to which the present technology has been applied will be described with reference to the drawings.

First Embodiment

<Structure Example of Image Processing Apparatus>

The present technology enables an infrared image and a color image that have high quality to be obtained by adopting a structure in which a light receiving surface of an image sensor has a pixel that only receives a visible light component that is significantly influenced by a color temperature and less influences a luminance component and does not receive an IR component, and a pixel that receives a visible light component that influences the luminance component and the IR component.

This present technology can be applied not only to a solid state image sensor such as a complementary metal oxide semiconductor (CMOS) image sensor, but also to various types of electric equipment including such a solid state image sensor, such as a smartphone, a personal computer, a personal computer (PC) camera, and a monitoring camera.

In the case of applying the present technology to a monitoring camera, for example, it is possible to obtain an infrared image and a color image that have high quality even if infrared light is cast in the nighttime with a conventional light casting system.

In addition, in the case of applying the present technology to a PC camera, for example, it is possible to provide one PC camera with the function of a Web camera for a video conference call and the function of a camera for personal authentication through use of infrared light.

Hereinafter, description will be continued using, as an example, the case of applying the present technology to an image processing apparatus having an imaging function by means of a solid state image sensor.

Now, hereinafter, a specific embodiment to which the present technology has been applied will be described.

Figure 1:
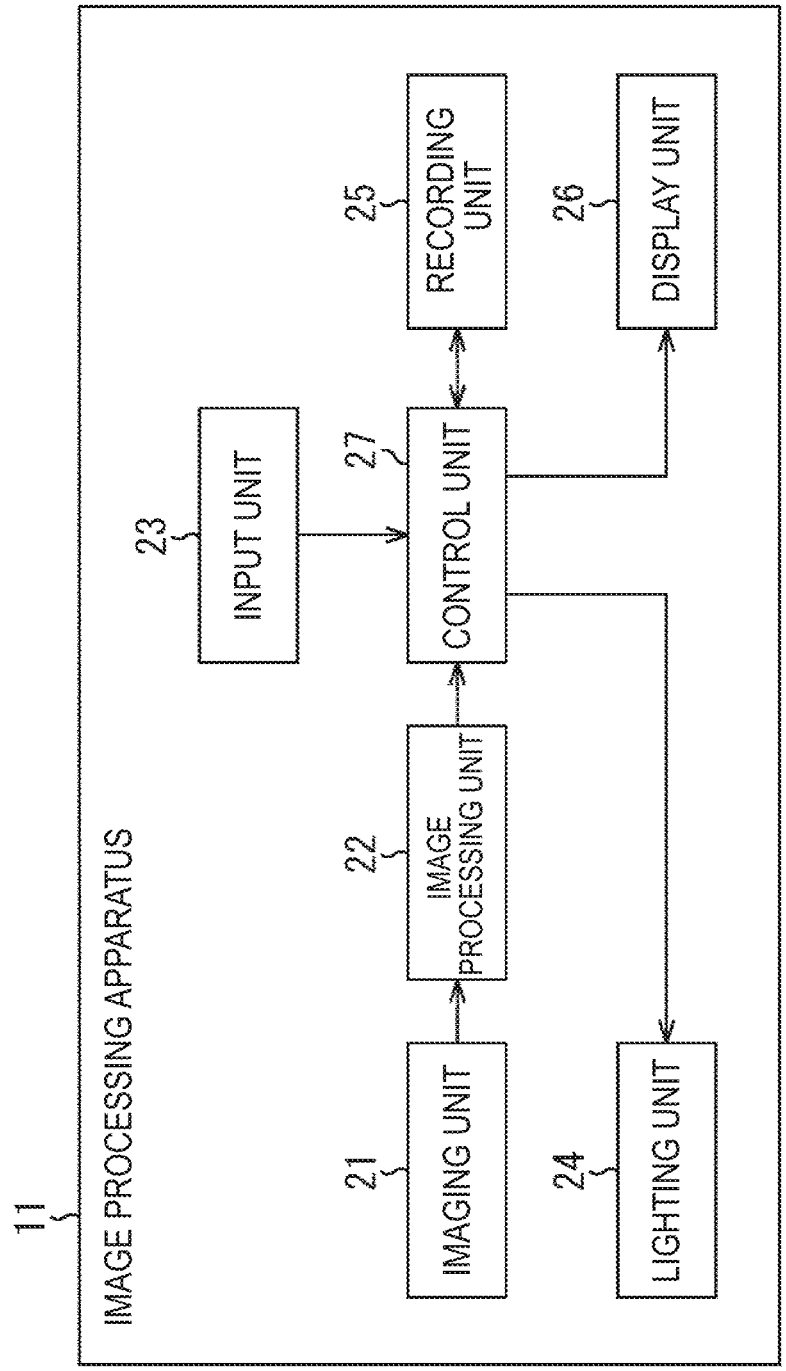
FIG. 1 is a diagram showing a structure example of an image processing apparatus.

FIG. 1 is a diagram showing a configuration example of one embodiment of an image processing apparatus to which the present technology has been applied.

An image processing apparatus 11 shown in FIG. 1 has an iris recognition function of recognizing an individual user from an iris image of the user who operates the image processing apparatus 11, for example, and a function of exchanging a color image with another image processing apparatus via a communication network to achieve a video conference call.

The image processing apparatus 11 includes an imaging unit 21, an image processing unit 22, an input unit 23, a lighting unit 24, a recording unit 25, a display unit 26, and a control unit 27.

The imaging unit 21 is implemented by a solid state image sensor, for example, and receives visible light or infrared light entered from the outside and performs photoelectric conversion to image a subject, and supplies a captured image obtained as a result to the image processing unit 22.

The image processing unit 22 generates an infrared image and a color image from the captured image supplied from the imaging unit 21 for supply to the control unit 27. For example, the infrared image is used for iris recognition, and the color image is used for a video conference call.

The input unit 23 is implemented by a mouse, a button, a keyboard, or the like to be operated by the user, and supplies a signal in accordance with a user's operation to the control unit 27. The lighting unit 24 emits infrared light in accordance with control of the control unit 27. That is, the lighting unit 24 emits infrared light to the user present at the front of the image processing apparatus 11. Emission of this infrared light is performed during iris recognition, during a dark time when an imaging environment is dark, and the like, for example.

The recording unit 25 records various types of data such as an infrared image and a color image supplied from the control unit 27, and supplies recorded data to the control unit 27. Besides, various programs and the like, for example, are also recorded in the recording unit 25.

The display unit 26 displays various images supplied from the control unit 27, such as an infrared image and a color image, for example.

The control unit 27 controls the operation of the image processing apparatus 11 as a whole. For example, the control unit 27 supplies an infrared image and a color image supplied from the image processing unit 22 to the recording unit 25 and the display unit 26, and causes a color image to be transmitted by a communication unit not shown to a communication partner of a video conference call.

<With Regard to Pixel Array of Imaging Unit>

In addition, a plurality of pixels that receive respective light components of visible light and infrared light are arrayed on the light receiving surface of the imaging unit 21 of the image processing apparatus 11.

Figure 2:
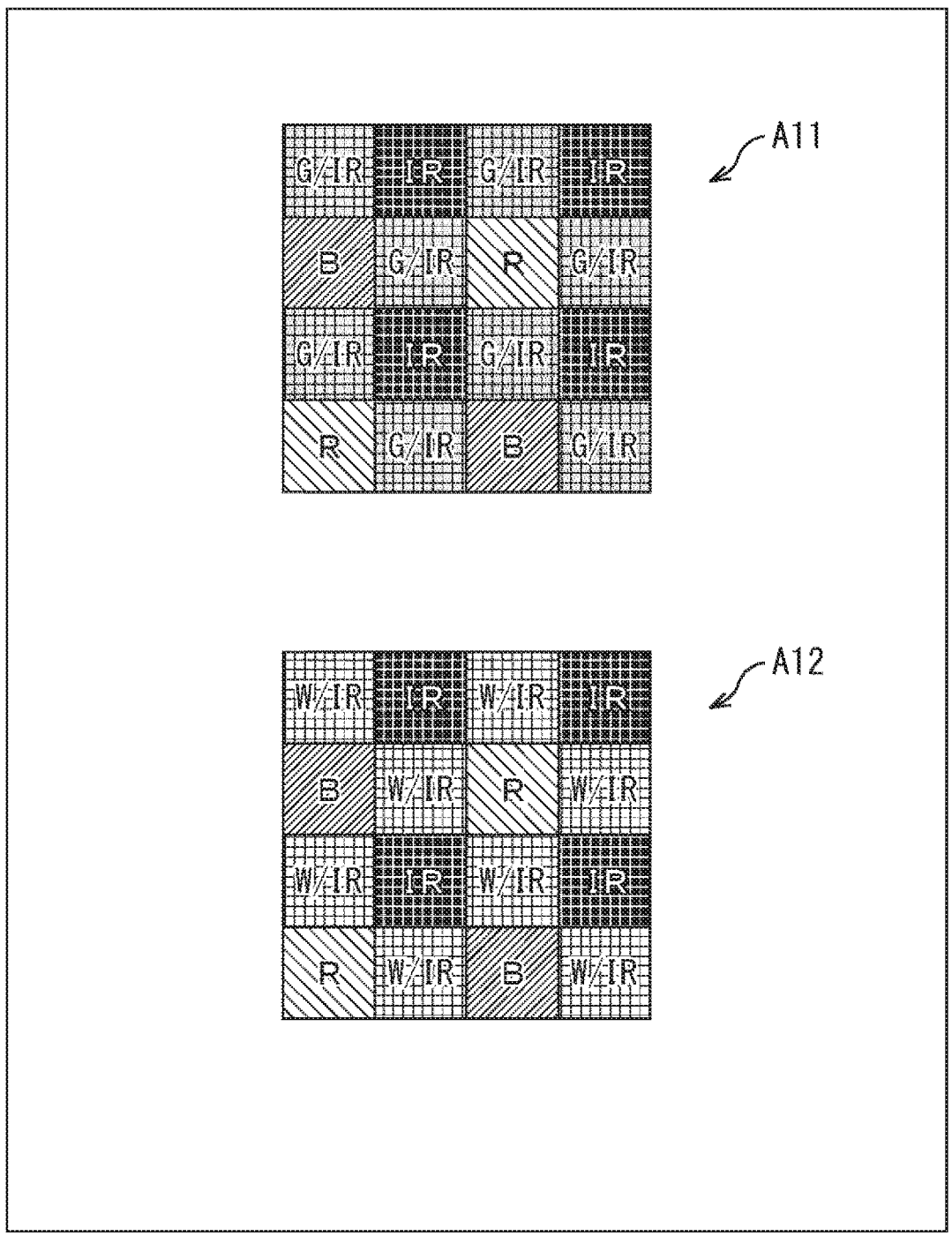
FIG. 2 is a diagram showing an example of a pixel array.

For example, the pixel array of the light receiving surface of the imaging unit 21 is an array indicated by an arrow A11 in FIG. 2. Note that, in FIG. 2, each rectangle represents one pixel, and the character indicated in each of those pixels indicates a component to be received by each pixel.

Specifically, a pixel denoted by the character "R" represents a pixel (hereinafter referred to as an R pixel as well) that only receives an R (red) component of visible light, and a pixel denoted by the character "B" represents a pixel (hereinafter referred to as a B pixel as well) that only receives a B (blue) component of visible light.

In addition, a pixel denoted by the characters "G/IR" represents a pixel (hereinafter referred to as a G/IR pixel as well) that receives a G (green) component of visible light and an infrared light (IR) component, and a pixel denoted by the characters "IR" represents a pixel (hereinafter referred to as an IR pixel as well) that only receives an infrared light (IR) component.

The example indicated by the arrow A11 presents a so-called Bayer array in which G/IR pixels are aligned in a checkerboard pattern. For example, paying attention to one IR pixel, G/IR pixels are arranged on the upper, lower, left, and right sides of that IR pixel in the diagram. In addition, an R pixel or a B pixel is arranged adjacent to the IR pixel in the diagonal direction.

Here, the G component is a color component that receives a larger amount of light than the R or B component, that is, has a higher output level of the pixel and influences the luminance component more significantly. In other words, as compared with the R component and the B component, the G component is a color component that significantly influences the luminance component of a color image to be finally obtained. Therefore, among pixels that receive the respective components, the G/IR pixels are arranged in the largest number.

In addition, the G/IR pixel that receives such a G component for significantly influencing the luminance component and reproducing a high frequency receives the IR component as well. In this manner, by causing the G/IR pixel that receives the G component to receive the IR component as well, a high resolution infrared image can be obtained.

Note that the output of the G/IR pixel is separated into the IR component and the G component according to necessity, whilst separation of the IR component and the G component is relatively easy since the output level of the G component is sufficiently high, and after the separation, noise (error) included in the G component will not increase.

In contrast, the R component and the B component are components that have lower output levels than the G component and less significantly influence the luminance component as compared with the G component, and are components that are influenced by the color temperature more significantly than the G component. That is, the outputs of the R pixel and the B pixel are significantly influenced by the color temperature in the imaging environment as compared with the output of the G/IR pixel.

Therefore, the R pixel and the B pixel are caused not to receive the IR component. In addition, the number of the R pixels and the B pixels provided on the light receiving surface of the imaging unit 21 is smaller than the number of the G/IR pixels and the IR pixels. In particular, in this example, the total number of the G/IR pixels and IR pixels on the light receiving surface is larger than the total number of the R pixels and the B pixels, and the relationship in number between those pixels is also the same on a captured image captured by the imaging unit 21. Accordingly, it is possible to obtain a high resolution infrared image.

In this manner, by causing the R pixel and the B pixel that are significantly influenced by the color temperature and less influences the luminance component not to receive the IR component, it is possible to suppress degradation of a color signal even in an imaging environment in which there is much infrared light, such as when infrared light is intensely emitted to a subject. That is, it is possible to improve color reproduction in a color image.

In addition, the pixel array in the imaging unit 21 is not limited to the example indicated by the arrow A11, but may be a pixel array as indicated by an arrow A12, for example.

In this example, a pixel denoted by the characters "W/IR" represents a pixel (hereinafter referred to as a W/IR pixel as well) that receives a W (white) component of visible light and an infrared light (IR) component. Consequently, the pixel array indicated by the arrow A12 is an array obtained by replacing the G/IR pixels in the pixel array indicated by the arrow A11 by the W/IR pixels.

Since the W component influences the luminance more significantly than the R component and the B component, and is less influenced by the color temperature than the R component and the B component similarly to the G component, it is possible to replace the G/IR pixels by the W/IR pixels. Alternatively, the G/IR pixels in the pixel array indicated by the arrow A11 may be replaced by pixels that receive a Y (yellow) component and the IR (infrared) component that similarly influence the luminance more significantly and are less influenced by the color temperature than the R component and the B component, or the like.

Hereinafter, description will be continued assuming that the pixel array of the light receiving surface of the imaging unit 21 is the pixel array indicated by the arrow A11.

<With Regard to Filter Structure of Each Pixel>

Subsequently, a filter structure of each pixel provided in the imaging unit 21 will be described with reference to FIG. 3 and FIG. 4.

Figure 3:
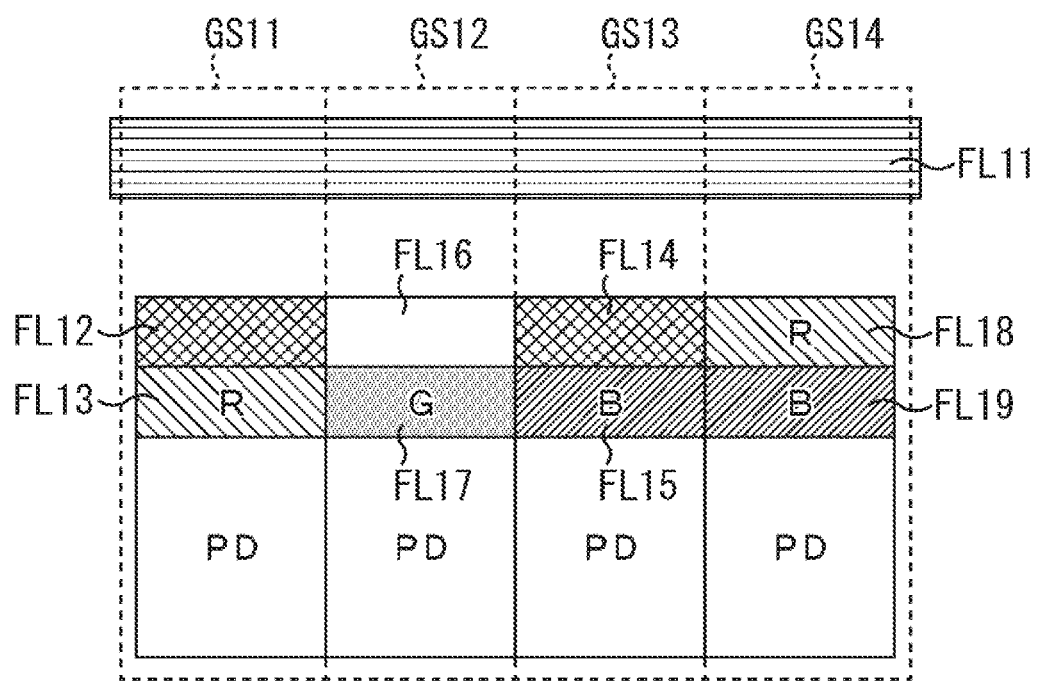
FIG. 3 is a diagram showing a filter structure of each pixel.

FIG. 3 shows a cross section of the light receiving surface of the imaging unit 21. In this example, a pixel GS11 which is an R pixel, a pixel GS12 which is a G/IR pixel, a pixel GS13 which is a B pixel, and a pixel GS14 which is an IR pixel are shown. In addition, rectangles denoted by the characters "PD" in the pixel GS11 to the pixel GS14 represent photo diodes (PD) as photoelectric conversion elements that subject incoming light to photoelectric conversion.

On the side opposite to the PD side of these pixel GS11 to pixel GS14, that is, on the subject side, a dual bandpass filter FL11 is provided in common to the respective pixels.

Figure 4:
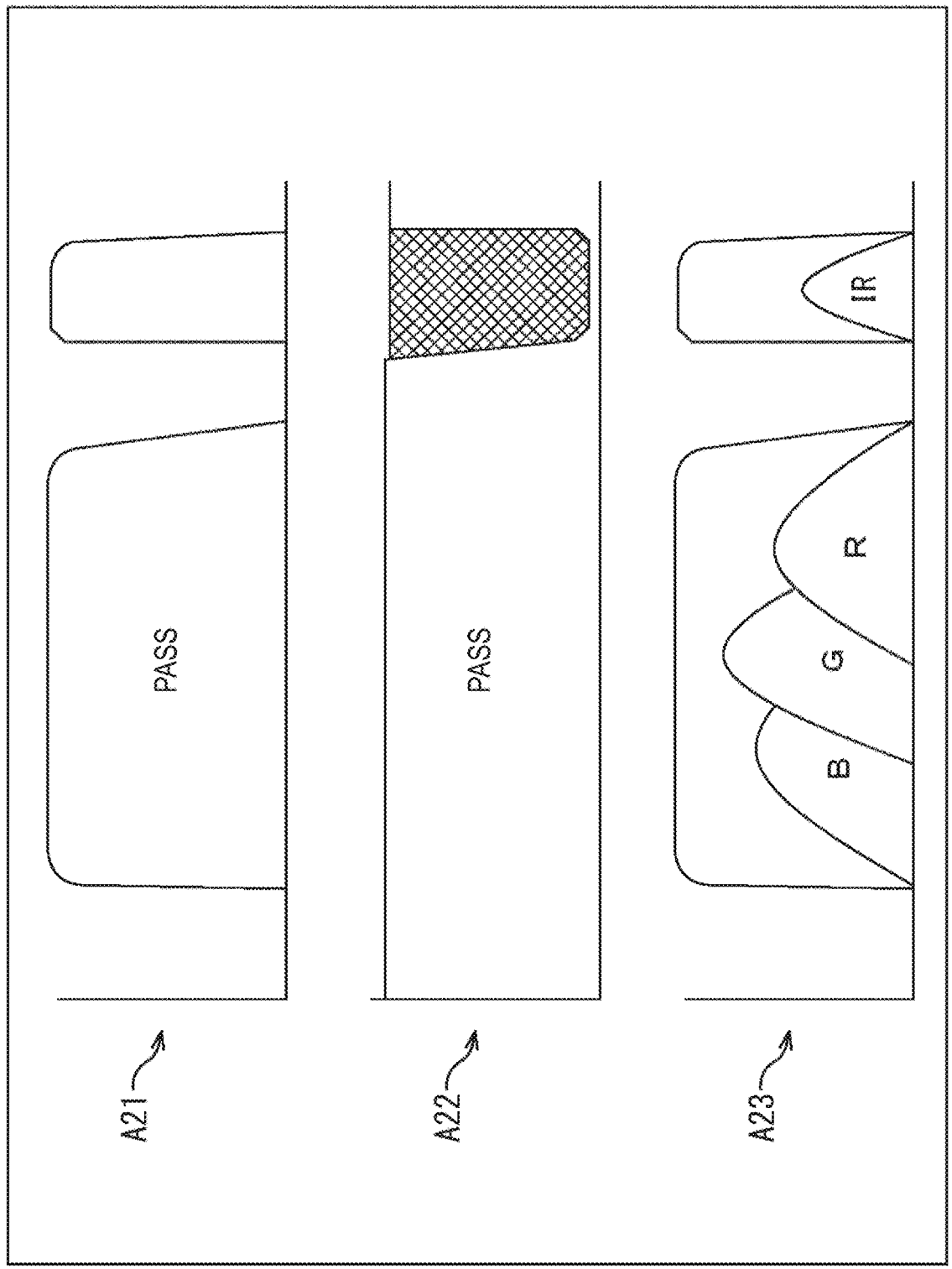
FIG. 4 is a diagram describing a filter property.

The property of this dual bandpass filter FL11 is a property that passes the respective R, G, and B components of visible light and the IR component and blocks components in other wavelength bands, as indicated by an arrow A21 in FIG. 4, for example.

Note that, in FIG. 4, the horizontal axis indicates the wavelength of light, and the vertical axis indicates the amount of light, that is, transmittance. In addition, an arrow A23 indicates the respective wavelength bands of the R component, the G component, the B component, and the IR component, and portions denoted by the characters indicating the respective components represent wavelength bands of those components.

Consequently, by providing the dual bandpass filter FL11 in common to all the pixels, it is possible to prevent light of components other than the R component, the G component, the B component, and the IR component from entering into each pixel.

In addition, in the pixel GS11 which is the R pixel as shown in FIG. 3, an infrared blocking filter FL12 that passes visible light and blocks the IR component and a color filter FL13 that only passes the R component are provided between the PD and the dual bandpass filter FL11.

Here, the infrared blocking filter FL12 is a filter that passes light in the wavelength bands of visible light and blocks infrared light, that is, light of the IR component, as indicated by an arrow A22 in FIG. 4. In addition, the color filter FL13 is a filter that only passes the R component. Consequently, only light of the R component enters into the PD of the pixel GS11 which is the R pixel.

Note that, in more detail, a color filter that only passes light of specific color components of visible light, such as the R component, the G component, and the B component, has a property of passing light of the IR component as well.

Therefore, in the pixel GS11, the color filter FL13 for the R component and the infrared blocking filter FL12 are provided in combination. In addition, here, of the color filter FL13 and the infrared blocking filter FL12, the color filter FL13 is provided on the PD side, whilst the infrared blocking filter FL12 may be provided on the PD side.

Similarly to the pixel GS11, in the pixel GS13 which is the B pixel shown in FIG. 3, an infrared blocking filter FL14 and a color filter FL15 that only passes the B component are provided between the PD and the dual bandpass filter FL11.

Here, since the infrared blocking filter FL14 is a filter having the same property as the infrared blocking filter FL12, only light of the B component enters into the PD of this pixel GS13. Also in this case, the infrared blocking filter FL14 may be provided on the PD side with respect to the color filter FL15.

Further, in the pixel GS12 which is the G/IR pixel, a filter FL16 and a color filter FL17 that only passes the G component are provided between the PD and the dual bandpass filter FL11.

Here, the filter FL16 is a transparent filter or the like for adjusting the light amount of light of each component that enters into the PD of the pixel GS12, for example, and adjusting the height of the filter layer, that is, the filter thickness.

That is, the thickness of the filter FL16, for example, shall be such a thickness that, in the vertical direction in FIG. 3, the upper level of the filters provided on the dual bandpass filter FL11 side in the respective pixels, such as the filter FL16, the infrared blocking filter FL12, and the infrared blocking filter FL14, becomes the same level in the diagram.

In addition, the filter FL16 is a filter for light amount adjustment having such a property that, when infrared light of the same light amount, enters into the pixel GS12 and the pixel GS14, for example, passes infrared light (IR component) such that the light amount of infrared light that enters into the PDs of those pixels is the same.

Since the filter FL16 is a filter that passes incoming light substantially as it is, and the color filter FL17 passes light of the G component and light of the IR component, light of the G component and light of the IR component enter into the PD of the pixel GS12.

Note that, also in the pixel GS12, the filter FL16 may be provided on the PD side with respect to the color filter FL17. In addition, color tone matching with surrounding pixels may be performed by the transmission property of the filter FL16.

Specifically, when the pixel array of the imaging unit 21 is the pixel array indicated by the arrow A12 in FIG. 2, and when the pixel GS12 is the W/IR pixel, for example, color tone matching can be performed by the filter FL16. That is, if color tone matching is performed by causing the optical property of the filter FL16, that is, the transmission property in each wavelength band to be such a property that the G component is correctly obtained when subtracting the R component and the B component obtained by surrounding pixels from the W component obtained by the pixel GS12 which is the W/IR pixel, it is possible to obtain a higher quality image.

In the pixel GS14 which is the IR pixel in FIG. 3, a color filter FL18 that only passes the R component and a color filter FL19 that only passes the B component are provided between the PD and the dual bandpass filter FL11.

Here, since the IR component is passed through these color filter FL18 and color filter FL19, only light of the IR component eventually enters into the PD of the pixel GS14. That is, the R component and the IR component are passed through the color filter FL18, but, of those R component and IR component, the R component is blocked by the color filter FL19.

In this manner, in the pixel GS14, a visible light blocking filter that only passes the IR component is achieved by combining color filters of color components of visible light different from each other. Note that, also in the pixel GS14, the color filter FL18 may be provided on the PD side with respect to the color filter FL19.

As described above, in the imaging unit 21, a filter that only passes a desired component is achieved by appropriately combining an infrared blocking filter and a color filter.

<With Regard to Generation of Infrared Image and Color Image>

Next, an infrared image and a color image generated in the image processing apparatus 11 will be described.

The image processing apparatus 11 performs image processing adopting the day mode in the case where there are more visible light components than the IR components in light entering into the imaging unit 21 from the outside, and adopting the night mode in the case where there are sufficiently more IR components than visible light components in light entering into the imaging unit 21 from the outside.

For example, in the case of emitting intense infrared light to a user as a subject in order to perform iris recognition, processing in the night mode is performed even in the case where the surroundings are sufficiently bright.

The image processing apparatus 11 performs different processing in the day mode and the night mode to generate an infrared image and a color image from a captured image obtained in the imaging unit 21.

Here, since the pixel array of the imaging unit 21 is the array indicated by the arrow A11 in FIG. 2, pixels of the captured image include a pixel only having the R component as a pixel value, a pixel only having the B component, a pixel only having the G component and the IR component, and a pixel only having the IR component. Hereinafter, those pixels on the captured image will be referred to as the R pixel, the B pixel, the G/IR pixel, and the IR pixel as well, similarly to the pixels of the imaging unit 21.

Figure 5:
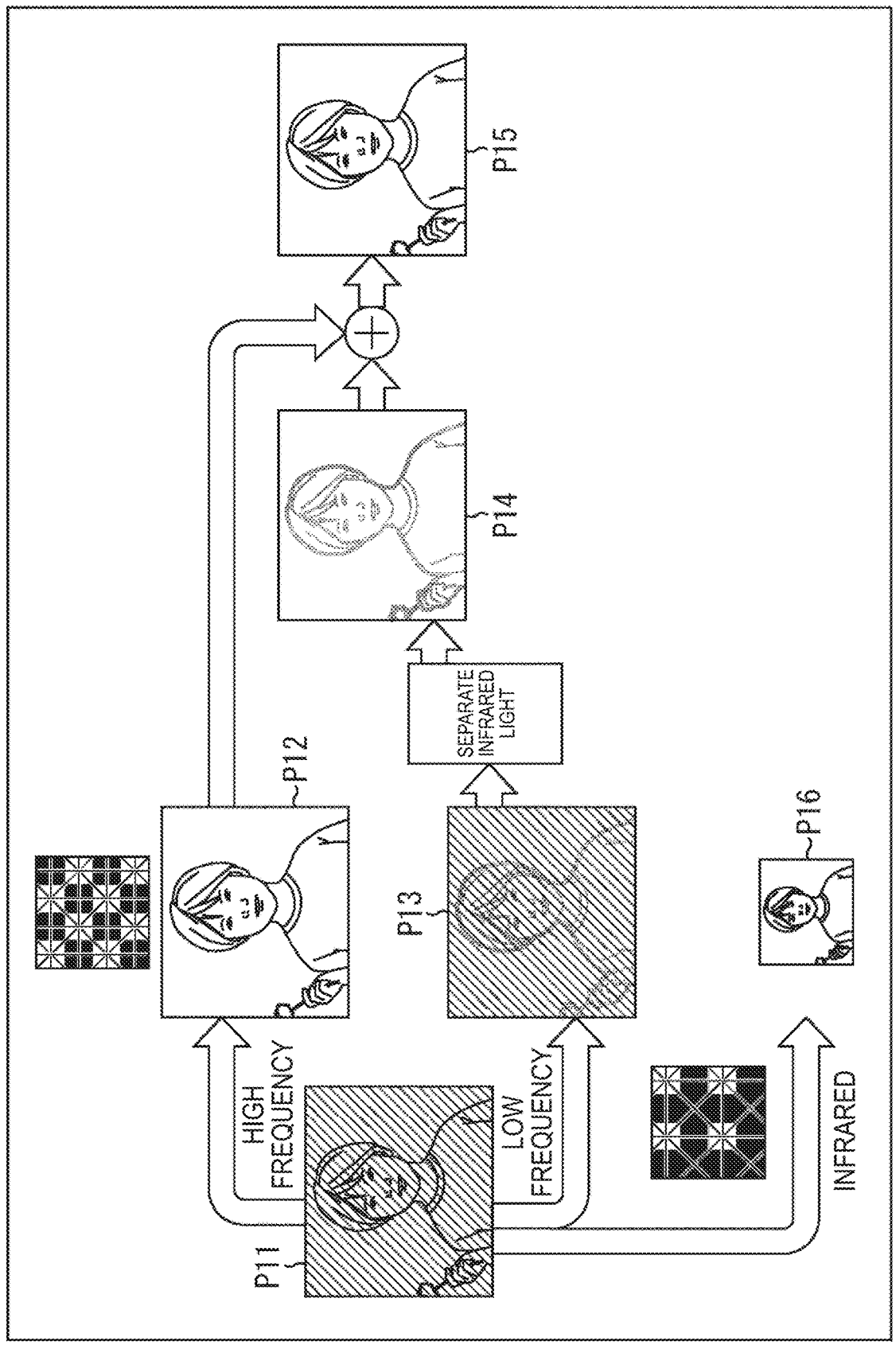
FIG. 5 is a diagram describing processing in a day mode.

In the day mode, for example, only the G component including a high frequency component is extracted from a captured image P11 obtained in the imaging unit 21 as shown in FIG. 5 to generate a visible light high frequency image P12 including a high frequency component. This visible light high frequency image P12 is an image obtained by extracting the high frequency component of visible light included in the captured image P11, and is equivalent to an edge image.

In addition, the R pixel, the B pixel, and the G/IR pixel including visible light components are extracted from the captured image P11 to obtain an extracted visible image P13, and further, the IR component is removed (separated) from the G/IR pixel of the extracted visible image P13 to generate a visible light low frequency image P14.

The visible light low frequency image P14 is an image including the respective light components of the R component, the G component, and the B component of visible light. This visible light low frequency image P14 can also be said as a low frequency component image of visible light included in the captured image P11.

When the visible light high frequency image P12 and the visible light low frequency image P14 are obtained in the foregoing manner, those visible light high frequency image P12 and visible light low frequency image P14 are synthesized to obtain a high resolution color image P15. This color image P15 is an image having the respective color components of visible light.

In addition, only the IR pixel is extracted from the captured image P11 to generate a low resolution infrared image P16. This low resolution infrared image P16 is an image that only includes the IR component and has a half resolution of the initial captured image P11.

In this manner, during the day mode, the low resolution infrared image P16 and color image P15 are generated from the captured image P11 as an infrared image and a color image.

Figure 6:
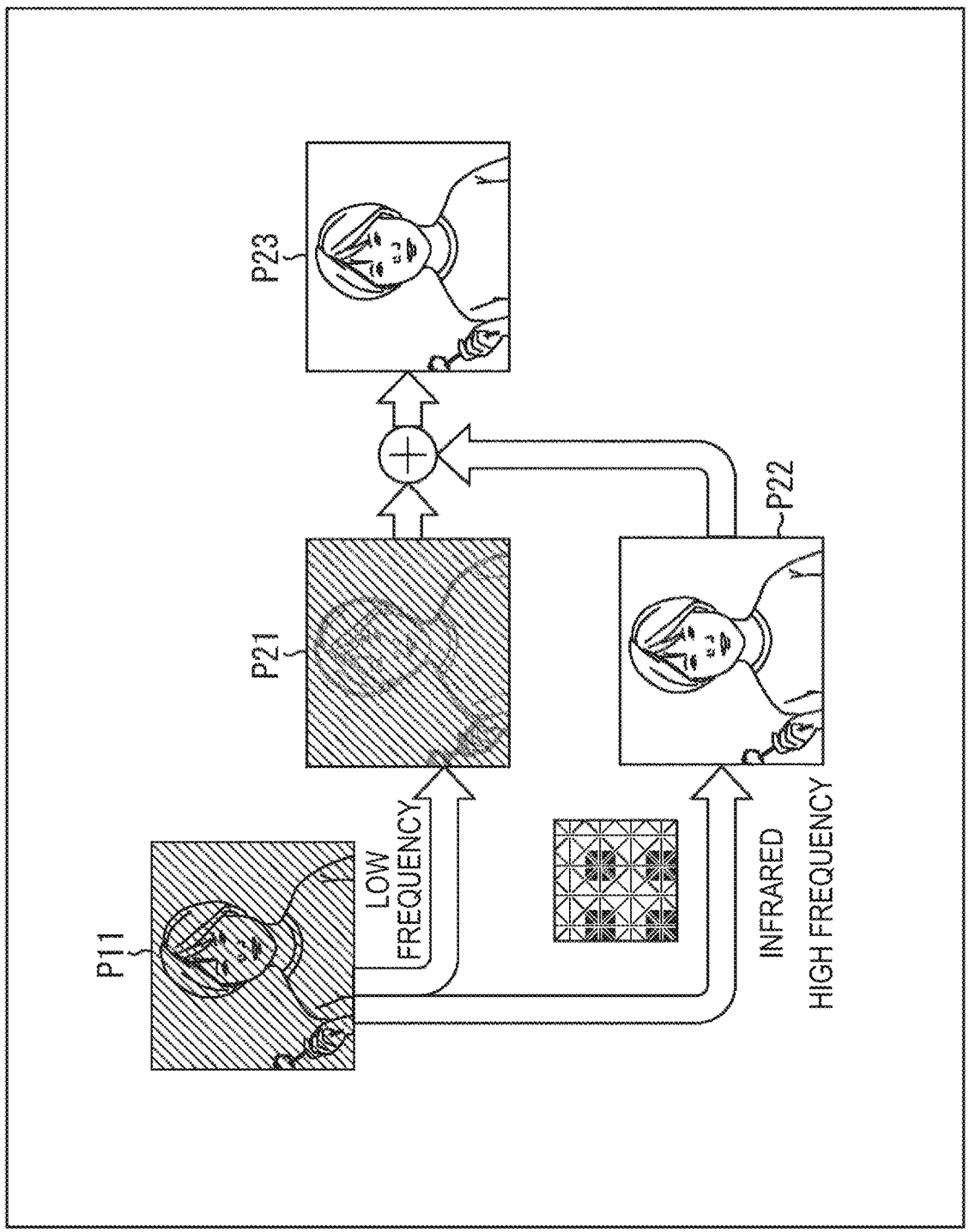
FIG. 6 is a diagram describing processing in a night mode.

In contrast, in the case where the night mode is adopted, the R pixel, the B pixel, and the G/IR pixel including visible light components are extracted from the captured image P11 to generate a visible light low frequency image P21, as shown in FIG. 6, for example. Note that portions in FIG. 6 that correspond to the case in FIG. 5 are denoted by identical reference characters, and description thereof will be omitted.

The visible light low frequency image P21 generated from the captured image P11 is a low frequency component image at least including the respective light components of the R component and the B component of visible light.

In addition, the G/IR pixel and the IR pixel are extracted from the captured image P11 to generate a high resolution infrared image P22 including a high frequency component of infrared light. This high resolution infrared image P22 is an image including a high frequency component and a luminance component as image information.

Consequently, it is also possible to use this high resolution infrared image P22 as an image corresponding to the visible light high frequency image P12 shown in FIG. 5. Thus, during the night mode, a high resolution pseudo-color image P23 is generated from the high resolution infrared image P22 and the visible light low frequency image P21.

Note that some methods of generating the color image P23 from the high resolution infrared image P22 and the visible light low frequency image P21 are conceivable.

For example, since the high resolution infrared image P22 is an image including a high frequency component, an infrared light high frequency image corresponding to the visible light high frequency image P12 can be obtained if only a high frequency component is extracted from the high resolution infrared image P22.

In this case, if the R pixel, the B pixel, and the G/IR pixel are extracted from the captured image P11 to generate the visible light low frequency image P21 including the R component, the B component, the G component, and the IR component, and this visible light low frequency image P21 and the infrared light high frequency image are synthesized, the high resolution color image P23 can be obtained.

In addition, since the high resolution infrared image P22 also includes a luminance component together with a high frequency component, it is also possible to use this high resolution infrared image P22 as it is.

In such a case, since the G/IR pixel of the high resolution infrared image P22 also includes the G component, only the R pixel and the B pixel may be extracted from the captured image P11 to generate the visible light low frequency image P21 including the R component and the B component. Then, the visible light low frequency image P21 and the high resolution infrared image P22 obtained in such a manner may be synthesized to obtain the color image P23.

Note that, hereinafter, the case of synthesizing an infrared light high frequency image and a visible light low frequency image to generate a color image will be described as an example.

In the night mode, the high resolution infrared image P22 and the color image P23 that have high resolution can be obtained in the foregoing manner.

In particular, in the image processing apparatus 11, both of an infrared image and a color image that have high resolution, that is, high quality can be obtained not only in a dark state where there is little visible light but also when infrared light is emitted in a state where there is much visible light and it is sufficiently bright.

Furthermore, in the image processing apparatus 11, it is not necessary to intermittently emit infrared light in order to obtain a color image. In the case of emitting infrared light intermittently, the exposure time for a visible image and an infrared image is halved because an exposure with visible light and an exposure with infrared light are performed individually. This increases noise in those images, and a signal to noise ratio (SN ratio) deteriorates.

However, in the image processing apparatus 11, the exposure time can be ensured sufficiently since intermittent emission of infrared light is unnecessary, and an infrared image and a color image that have low noise and high quality can be obtained.

Figure 7:
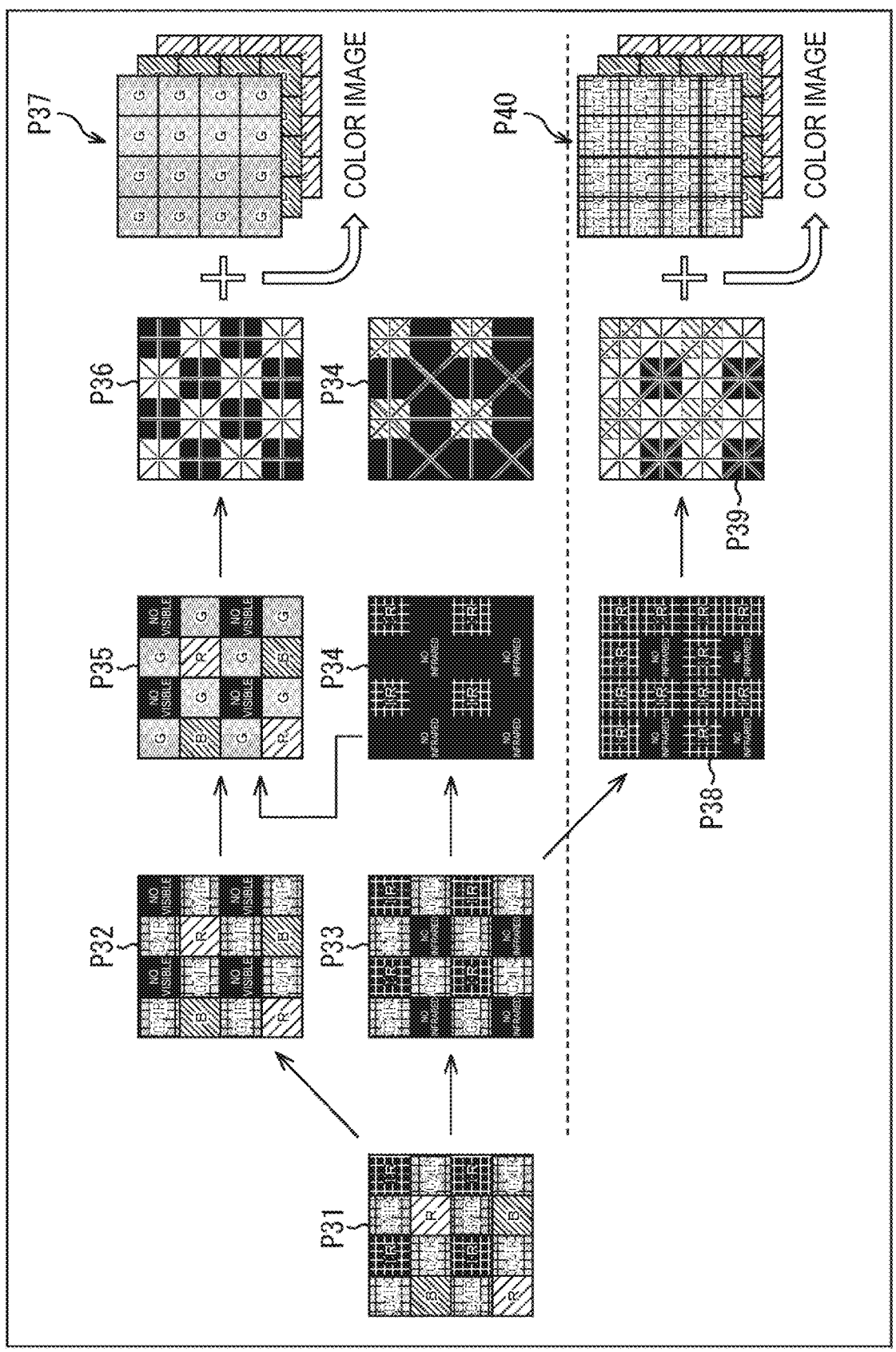
FIG. 7 is a diagram describing a specific processing example in the day mode and the night mode.

Further, an example of processing during the day mode and during the night mode will be described more specifically with reference to FIG. 7. Note that, in FIG. 7, rectangles in each image represent pixels, and the character in each pixel represents a component that the pixel value of each pixel has.

First, when a captured image P31 is obtained by imaging in the imaging unit 21, an extracted visible image P32 and an extracted infrared image P33 are extracted from this captured image P31.

The extracted visible image P32 is an image obtained by extracting the R pixel, the B pixel, and the G/IR pixel from the captured image P31, and a pixel denoted by the characters "no visible" in the extracted visible image P32 is a pixel that corresponds to the IR pixel and has no pixel value.

In addition, the extracted infrared image P33 is an image obtained by extracting the G/IR pixel and the IR pixel from the captured image P31, and a pixel denoted by the characters "no infrared" in the extracted infrared image P33 is a pixel that corresponds to the R pixel or the B pixel and has no pixel value.

When the extracted visible image P32 and the extracted infrared image P33 are obtained in this manner, an infrared image and a color image are generated from these images.

That is, in the case where the day mode is adopted, only the IR pixel is extracted from the extracted infrared image P33 to generate a low resolution infrared image P34. Since components included in the pixel value of the G/IR pixel include more G components than IR components in the day mode, only the IR pixels are used to generate the low resolution infrared image P34 as an infrared image. This low resolution infrared image P34 is an image having a half resolution of the captured image P31 as described above.

In addition, in the day mode, the low resolution infrared image P34 is used, and the IR component is removed from the image value of the G/IR pixel of the extracted visible image P32 to generate a visible image P35. This visible image P35 is an image including a pixel having, as a pixel value, the value of any component of the R component, the G component, and the B component and a pixel having no pixel value. Hereinafter, in particular, a pixel having the G component as a pixel value in the visible image P35 will be referred to as a G pixel as well. This G pixel is a pixel having the same positional relationship as the G/IR pixel of the extracted visible image P32.

Here, a method of removing the IR component in the G/IR pixel of the extracted visible image P32, that is, separating the G component and the IR component may be any method.

Filtering processing through use of an interpolation filter or a smoothing filter may be carried out on the low resolution infrared image P34, for example, to obtain the IR component of a pixel at the same position as the G/IR pixel of the extracted visible image P32, and the value of the IR component may be subtracted from the pixel value of the G/IR pixel of the extracted visible image P32 to obtain the G component.

In addition, the pixel value of a pixel having the IR component in the vicinity of the position of the low resolution infrared image P34 having the same positional relationship as the G/IR pixel of the extracted visible image P32, for example, may be subtracted from the G/IR pixel of the extracted visible image P32 to obtain the G component. That is, the pixel value of the IR pixel in the vicinity of the G/IR pixel may be used as it is as the value of the IR component at the position of the G/IR pixel.

When the visible image P35 is obtained in this manner, interpolation processing is performed only using the G pixel of the visible image P35, and a visible light high frequency image P36 having the same size as the captured image P31 is generated.

In addition, demosaicing processing is performed on the visible image P35, and a visible light low frequency image P37 including the R image in which each pixel has the R component, the G image in which each pixel has the G component, and the B image in which each pixel has the B component is generated. This visible light low frequency image P37 is an image having the same size as the captured image P31.

Further, the visible light high frequency image P36 and the visible light low frequency image P37 are synthesized to generate a color image of visible light having the same size as the captured image P31.

In this manner, during the day mode, the low resolution infrared image P34 and a high resolution color image are generated.

In contrast, in the night mode, white balance adjustment is performed on the extracted infrared image P33 to generate a corrected infrared image P38.

In the night mode, since there are many IR components to such an extent that the G components are negligible, that is, since it can be said that most of the components that the G/IR pixel has are IR components, an infrared image is generated also using the G/IR pixel. That is, the G/IR pixel is treated substantially as the IR pixel although there is a minute difference.

However, in the case of obtaining the IR component of the pixel denoted by the characters "no infrared" in the extracted infrared image P33 by interpolation processing, since the G/IR pixel also includes the G component albeit slightly, it is not possible to obtain an appropriate IR component by performing interpolation using such a G/IR pixel and an IR pixel as they are.

In addition, it is also possible to perform interpolation processing only using the IR pixel or perform interpolation processing only using the G/IR pixel, whilst in such a case, pixels that can be used for interpolation processing are fewer than in the case of performing interpolation processing using both of the G/IR pixel and the IR pixel. Then, it may be impossible to estimate the IR component with sufficient accuracy.

Thus, in the image processing apparatus 11, the white balance adjustment is performed on the extracted infrared image P33, that is, gain adjustment for each pixel is performed such that the output level of the G/IR pixel becomes the same level as the output level of the IR pixel, and the corrected infrared image P38 is obtained.

Using such a corrected infrared image P38, interpolation processing can be performed using more G/IR pixels and IR pixels in the vicinity of a pixel for which the IR component is to be obtained, and the IR component can be estimated more appropriately, that is, with higher accuracy. As a result, it is possible to obtain a higher resolution infrared image.

Note that, since the G/IR pixel after the white balance adjustment is treated as the IR pixel in the corrected infrared image P38, the characters "IR" are illustrated in the G/IR pixel here.

In addition, the white balance adjustment on the extracted infrared image P33 may be performed in the whole region of the extracted infrared image P33, or may be performed only in a desired region such as a user's eye region used for iris recognition, for example.

Further, the white balance adjustment on the extracted infrared image P33 may not be performed, or the output level of the G/IR pixel and the output level of the IR pixel may be compared in each region of the extracted infrared image P33, and whether to perform the white balance adjustment may be determined in each region in accordance with the result of comparison.

In the case of performing the white balance adjustment only in a specific region, for example, or in each region, more appropriate adjustment can be performed than in the case of performing the white balance adjustment for the whole extracted infrared image P33 with an identical gain.

This is because, in the case where there are subjects significantly different in reflectance of the G component in each region of the extracted infrared image P33, for example, a region in which level adjustment is not necessarily performed appropriately may occur when the white balance adjustment is performed on the whole extracted infrared image P33. In contrast, in the case of adjusting the white balance only in a specific narrow region, more appropriate adjustment can be performed since subjects significantly different in reflectance of the G component are unlikely to be present in that specific region.

By performing the white balance adjustment only in a specific region such as a user's eye region used for iris recognition, an infrared image having sufficient resolution in a necessary region can be obtained with a smaller amount of computation.

Hereinafter, description will be continued assuming that a user's eye region used for iris recognition in the extracted infrared image P33 is a target region, and the white balance adjustment is performed only in that target region.

When the corrected infrared image P38 is obtained by the white balance adjustment, the IR component in a pixel denoted by the characters "no infrared" in that corrected infrared image P38 is obtained by interpolation processing, and a high resolution infrared image P39 in which all the pixels have the IR component is generated as an infrared image.

This high resolution infrared image P39 is an image corresponding to the high resolution infrared image P22 shown in FIG. 6 and having the same size as the captured image P31. Since the IR component can be obtained in many pixels, that is, the G/IR pixels and the IR pixels in the night mode as is understood from the extracted infrared image P33, a high resolution infrared image can be obtained.

In addition, in the night mode, demosaicing processing is performed on the extracted visible image P32 to generate a visible light low frequency image P40 including the R image in which each pixel has the R component, the G/IR image in which each pixel has the G component and the IR component, and the B image in which each pixel has the B component. This visible light low frequency image P40 is an image having the same size as the captured image P31.

Then, a high resolution color image is generated from the high resolution infrared image P39 and the visible light low frequency image P40 obtained in the foregoing manner.

In more detail, filtering processing through use of a high pass filter (HPF) is carried out on the high resolution infrared image P39, for example, to extract a high frequency component, and an infrared light high frequency image is generated. Further, that infrared light high frequency image and the visible light low frequency image P40 are synthesized to obtain a color image. This color image is an image having the same size as the original captured image P31.

In the foregoing manner, the high resolution infrared image P39 and a color image that have high resolution are generated during the night mode.

<Configuration Example of Image Processing Unit>

Figure 8:
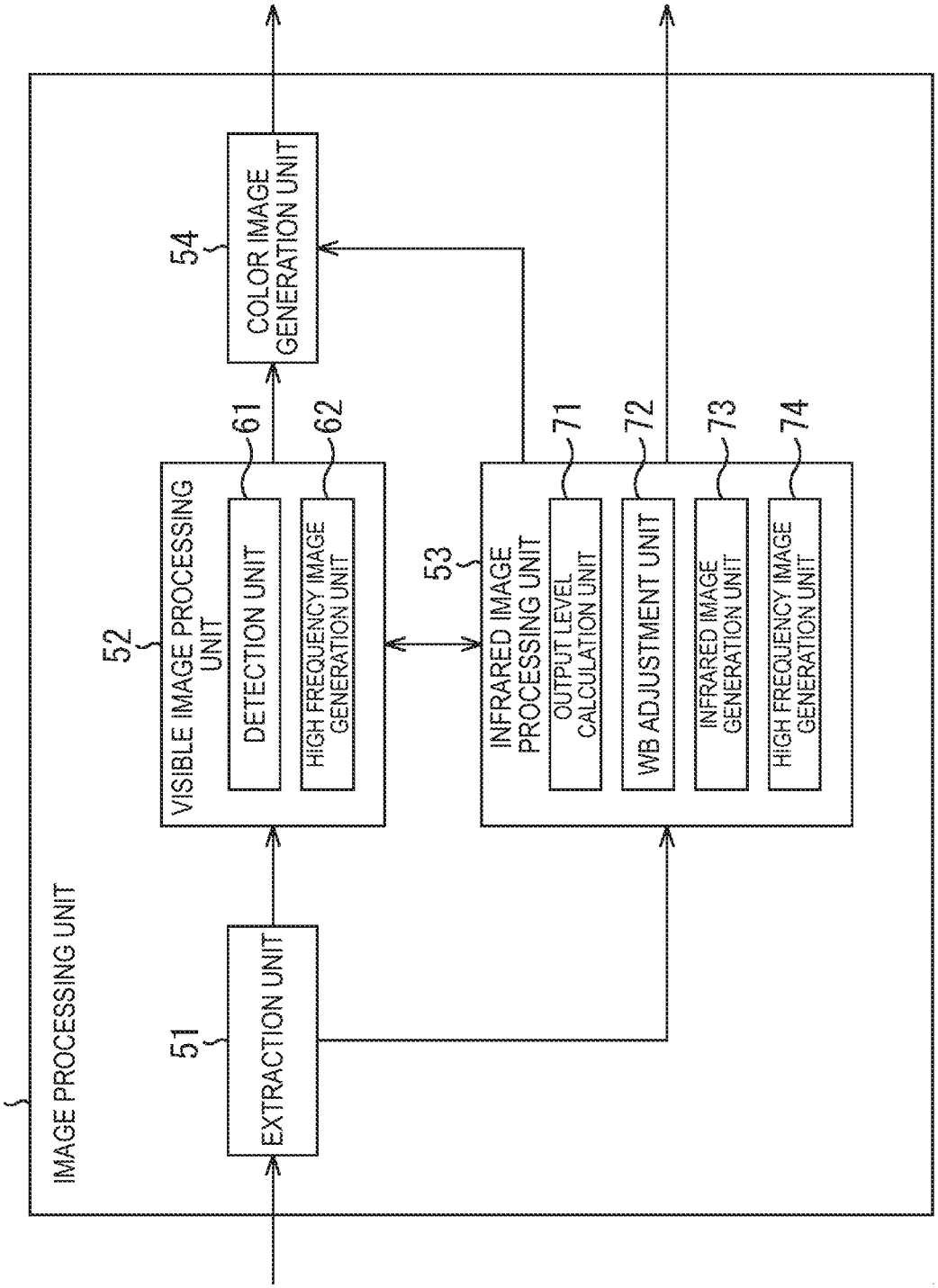
FIG. 8 is a diagram showing a configuration example of an image processing unit.

In the case where the above-described processing is performed in the image processing apparatus 11, the image processing unit 22 of the image processing apparatus 11 has a configuration as shown in FIG. 8, for example.

The image processing unit 22 shown in FIG. 8 includes an extraction unit 51, a visible image processing unit 52, an infrared image processing unit 53, and a color image generation unit 54.

The extraction unit 51 generates an extracted visible image from the captured image supplied from the imaging unit 21 for supply to the visible image processing unit 52, and generates an extracted infrared image from the captured image for supply to the infrared image processing unit 53. That is, in the extraction unit 51, a pixel of a predetermined component is extracted from a captured image to generate an extracted visible image and an extracted infrared image.

The visible image processing unit 52 generates a visible light low frequency image and a visible light high frequency image on the basis of the extracted visible image supplied from the extraction unit 51 for supply to the color image generation unit 54. Note that the visible light high frequency image is generated only during the day mode.

The visible image processing unit 52 includes a detection unit 61 and a high frequency image generation unit 62.

The detection unit 61 detects a user's eye region from the extracted visible image by image recognition or the like, and supplies the detection result to the infrared image processing unit 53. In the infrared image processing unit 53, the detected user's eye region is determined as a target region on which the white balance adjustment for the G/IR pixel and the IR pixel is to be performed.

Note that the example of extracting a user's eye region from the extracted visible image will be described here, whilst the user's eye region may be detected alternatively from a captured image, a visible image, an extracted infrared image, an interpolated infrared image, or the like. In addition, the user's eye region may be detected by an external sensor or the like, or the eye region may be designated by an input operation by the user or the like.

The high frequency image generation unit 62 generates a visible light high frequency image on the basis of a visible image obtained from the extracted visible image.

The infrared image processing unit 53 generates a low resolution infrared image, a high resolution infrared image, or an infrared light high frequency image on the basis of the extracted infrared image supplied from the extraction unit 51.

That is, during the day mode, the infrared image processing unit 53 generates a low resolution infrared image for supply to the control unit 27. In addition, during the night mode, the infrared image processing unit 53 generates a high resolution infrared image for supply to the control unit 27, and generates an infrared light high frequency image for supply to the color image generation unit 54.

The infrared image processing unit 53 includes an output level calculation unit 71, a white balance (WB) adjustment unit 72, an infrared image generation unit 73, and a high frequency image generation unit 74.

The output level calculation unit 71 calculates, as a level ratio, the ratio between the output level of the G/IR pixel and the output level of the IR pixel in the target region of the extracted infrared image on the basis of the detection result supplied from the detection unit 61. The WB adjustment unit 72 performs the white balance adjustment on the target region of the extracted infrared image on the basis of the level ratio to generate a corrected infrared image.

The infrared image generation unit 73 generates an infrared image. That is, the infrared image generation unit 73 generates a low resolution infrared image from the extracted infrared image during the day mode, and generates a high resolution infrared image from the corrected infrared image during the night mode.

The high frequency image generation unit 74 generates an infrared light high frequency image on the basis of the high resolution infrared image.

The color image generation unit 54 synthesizes the visible light low frequency image supplied from the visible image processing unit 52 and the visible light high frequency image supplied from the visible image processing unit 52 or the infrared light high frequency image supplied from the infrared image processing unit 53 to generate a color image for supply to the control unit 27.

<Description of Imaging Processing>

Subsequently, the operation of the image processing apparatus 11 will be described. When imaging of a subject is instructed, the image processing apparatus 11 performs imaging processing to generate an infrared image and a color image.

Figure 9:
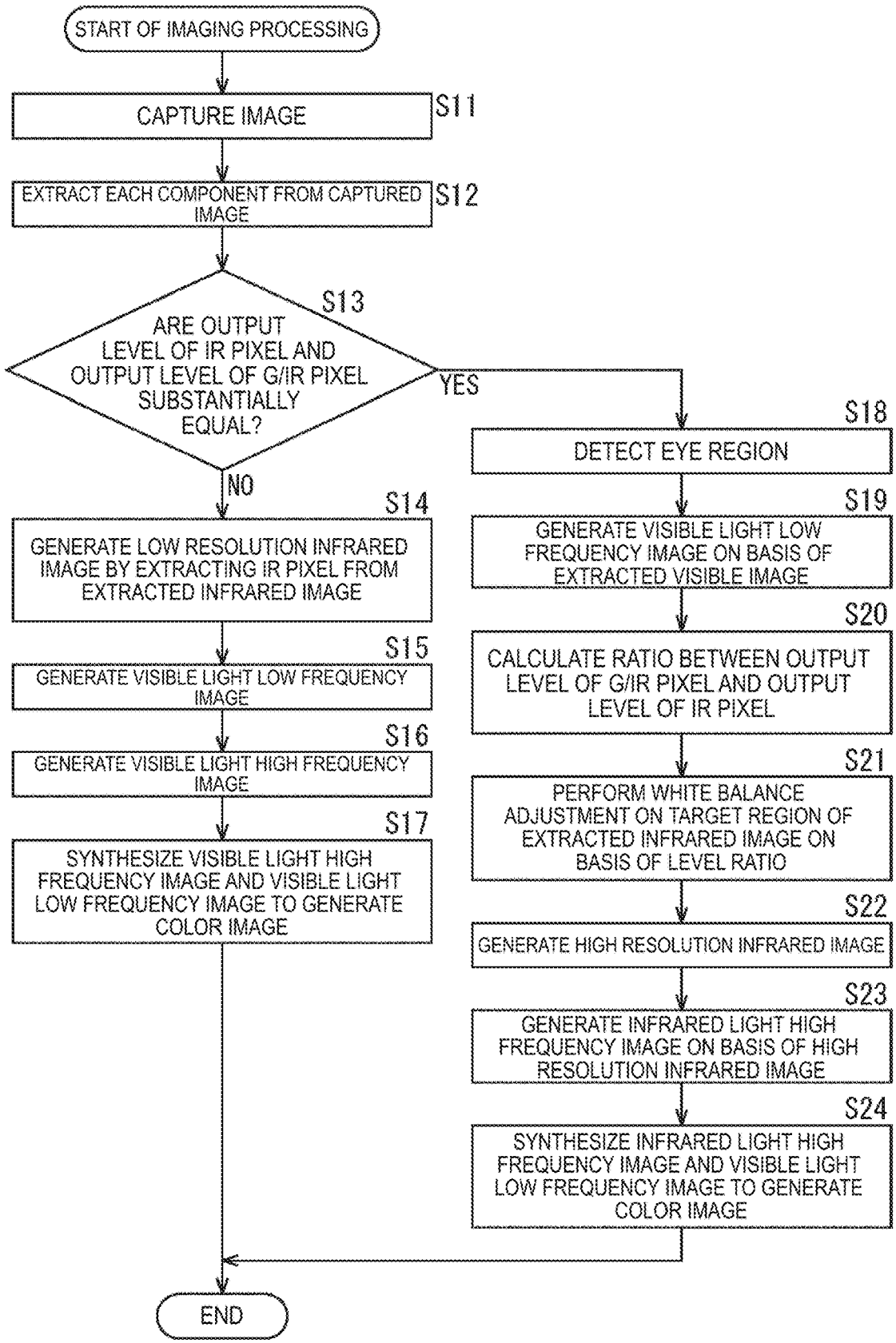
FIG. 9 is a flowchart describing imaging processing.

Hereinafter, imaging processing performed by the image processing apparatus 11 will be described with reference to the flowchart of FIG. 9.

In step S11, the imaging unit 21 images a subject, and supplies a captured image obtained as a result to the extraction unit 51 of the image processing unit 22. This captured image corresponds to the captured image P31 shown in FIG. 7, for example.

In step S12, the extraction unit 51 extracts each component from the captured image supplied from the imaging unit 21.

That is, the extraction unit 51 extracts an extracted visible image from the captured image for supply to the visible image processing unit 52, and extracts an extracted infrared image from the captured image for supply to the infrared image processing unit 53. For example, the extracted visible image and the extracted infrared image correspond to the extracted visible image P32 and the extracted infrared image P33 shown in FIG. 7, respectively.

In step S13, the output level calculation unit 71 determines whether or not the output level of the IR pixel and the output level of the G/IR pixel are substantially equal on the basis of the extracted infrared image supplied from the extraction unit 51.

Specifically, the output level calculation unit 71, for example, obtains a difference absolute value between the average value of the pixel values of all the IR pixels on the extracted infrared image and the average value of the pixel values of all the G/IR pixels on the extracted infrared image, and in the case where the difference absolute value is smaller than or equal to a previously determined threshold value, determines that the output levels are substantially equal.

The state in which the output levels of the IR pixel and the G/IR pixel are substantially equal refers to a state in which there is such a large light amount of infrared light that visible light, that is, the G component is negligible in an imaging environment of the captured image. Consequently, in such a case, the image processing apparatus 11 performs subsequent processing in the night mode.

Note that the example of obtaining the average value of the pixel values of the respective pixels in the whole extracted infrared image has been described here, whilst, alternatively, the extracted infrared image may be divided into several regions, and the average value of the pixel values of the IR pixels and the average value of the pixel values of the G/IR pixels may be obtained for each of those regions, for example.

In this case, for the IR pixels and the G/IR pixels, the integration value of the average values or the average value of the pixel values obtained for each region is further calculated, and a difference absolute value between the integration value or the average value of those IR pixels and the integration value or the average value of the G/IR pixels is compared with a threshold value.

Further, for example, a difference absolute value between the integration value of the pixel values of all the IR pixels on the extracted infrared image and the integration value of the pixel values of all the G/IR pixels on the extracted infrared image may be compared with a threshold value.

In the case where it is not determined in step S13 that the output level of the IR pixel and the output level of the G/IR pixel are substantially equal, the image processing apparatus 11 adopts the day mode, and the process proceeds into step S14.

In step S14, the infrared image generation unit 73 generates a low resolution infrared image by extracting the IR pixel from the extracted infrared image supplied from the extraction unit 51, and supplies the low resolution infrared image to the control unit 27. In addition, the infrared image generation unit 73 supplies the low resolution infrared image to the visible image processing unit 52 as well. The low resolution infrared image obtained in this manner corresponds to the low resolution infrared image P34 in FIG. 7, for example.

In step S15, the visible image processing unit 52 generates a visible light low frequency image from the extracted visible image supplied from the extraction unit 51 on the basis of the low resolution infrared image supplied from the infrared image generation unit 73.

That is, the visible image processing unit 52 obtains the IR component of a pixel at the same position as the G/IR pixel of the extracted visible image by carrying out filtering processing through use of an interpolation filter, a smoothing filter, or the like on the low resolution infrared image, or the like. Then, the visible image processing unit 52 extracts the G component in the G/IR pixel by subtracting the value of the obtained IR component from the pixel value of the G/IR pixel in the extracted visible image to generate a visible image including the R pixel, the B pixel, and the G pixel. This visible image corresponds to the visible image P35 in FIG. 7, for example.

Further, the visible image processing unit 52 performs demosaicing processing on the obtained visible image to generate a visible light low frequency image for supply to the color image generation unit 54. This visible light low frequency image corresponds to the visible light low frequency image P37 in FIG. 7, for example.

In step S16, the high frequency image generation unit 62 of the visible image processing unit 52 generates a visible light high frequency image on the basis of the visible image obtained in the processing in step S15 for supply to the color image generation unit 54. For example, the high frequency image generation unit 62 obtains the G component at each pixel position other than the G pixel in the visible image by interpolation processing only using the G pixel in the visible image to generate a visible light high frequency image. This visible light high frequency image corresponds to the visible light high frequency image P36 in FIG. 7, for example.

In step S17, the color image generation unit 54 synthesizes the visible light high frequency image supplied from the visible image processing unit 52 and the visible light low frequency image to generate a color image.

The color image generation unit 54 supplies the obtained color image to the control unit 27, and the imaging processing ends. The low resolution infrared image and the color image obtained in the foregoing manner are recorded in the recording unit 25 by the control unit 27, or supplied to the display unit 26 for display, or transmitted to the outside via a communication network.

In addition, in step S13, in the case where it is determined that the output level of the IR pixel and the output level of the G/IR pixel are substantially equal, the image processing apparatus 11 adopts the night mode, and the process proceeds into step S18.

In step S18, the detection unit 61 detects a user's eye region from the extracted visible image supplied from the extraction unit 51 by image recognition or the like, and supplies the detection result to the infrared image processing unit 53.

In step S19, the visible image processing unit 52 generates a visible light low frequency image on the basis of the extracted visible image supplied from the extraction unit 51 for supply to the color image generation unit 54.

For example, the visible image processing unit 52 generates the visible light low frequency image by performing demosaicing processing on the extracted visible image. This visible light low frequency image corresponds to the visible light low frequency image P40 in FIG. 7, for example.

In step S20, the output level calculation unit 71 calculates, as a level ratio, the ratio between the output level of the G/IR pixel and the output level of the IR pixel in the target region of the extracted infrared image supplied from the extraction unit 51 on the basis of the detection result supplied from the detection unit 61.

That is, the output level calculation unit 71 determines a user's eye region in the extracted infrared image to be a target region, and obtains the average value of the pixel values of all the G/IR pixels in that target region as the output level of the G/IR pixels, while obtaining the average value of the pixel values of all the IR pixels in the target region as the output level of the IR pixels. Then, the output level calculation unit 71 determines the ratio between the output level of the G/IR pixel and the output level of the IR pixel to be a level ratio.

Note that the level ratio may be calculated assuming the integration value of the pixel values of all the G/IR pixels in the target region as the output level of the G/IR pixel, and the integration value of the pixel values of all the IR pixels in the target region as the output level of the IR pixel. In addition, in the case where the white balance adjustment is performed on the whole extracted infrared image, for example, the extracted infrared image may be divided into several regions, and the level ratio may be obtained for each of those regions, for example. Similarly, also in the case where there are a plurality of target regions, the level ratio may be obtained for each of those target regions.

In step S21, the WB adjustment unit 72 performs the white balance adjustment on the target region of the extracted infrared image on the basis of the level ratio obtained in the processing in step S20 to generate a corrected infrared image. In the white balance adjustment, the pixel value of the G/IR pixel and the pixel value of the IR pixel are subjected to gain adjustment on the basis of the level ratio. The corrected infrared image obtained in this manner corresponds to the corrected infrared image P38 in FIG. 7, for example.

In step S22, the infrared image generation unit 73 performs interpolation processing on the corrected infrared image to generate a high resolution infrared image for supply to the control unit 27.

For example, in the interpolation processing, the IR component of pixels not having the IR component in the corrected infrared image, that is, pixels having the same positional relationship as the R pixel and the B pixel in the captured image is obtained by interpolation. The high resolution infrared image obtained in this manner corresponds to the high resolution infrared image P39 in FIG. 7, for example.

In step S23, the high frequency image generation unit 74 generates an infrared light high frequency image on the basis of the high resolution infrared image for supply to the color image generation unit 54. For example, the high frequency image generation unit 74 generates the infrared light high frequency image by carrying out filtering processing through use of HPF on the high resolution infrared image.

In step S24, the color image generation unit 54 synthesizes the infrared light high frequency image supplied from the infrared image processing unit 53 and the visible light low frequency image supplied from the visible image processing unit 52 to generate a color image.

The color image generation unit 54 supplies the obtained color image to the control unit 27, and the imaging processing ends. The high resolution infrared image and the color image obtained in the foregoing manner are recorded in the recording unit 25 by the control unit 27, or supplied to the display unit 26 for display, or transmitted to the outside via a communication network. In addition, in the control unit 27, iris recognition is performed on the basis of the high resolution infrared image.

Note that, in the case where the high resolution infrared image is used as it is to generate a color image in the night mode, the visible image processing unit 52 extracts only the R pixel and the B pixel from the extracted visible image, and performs demosaicing processing to generate a visible light low frequency image in step S19. Then, the processing in step S23 is not performed, and in step S24, the color image generation unit 54 synthesizes the high resolution infrared image and the visible light low frequency image to generate a color image.

In the foregoing manner, the image processing apparatus 11 performs imaging with the imaging unit 21 including the R pixel, the B pixel, the G/IR pixel, and the IR pixel, and generates an infrared image and a color image from the obtained captured image.

Consequently, a high resolution, that is, high quality color image can be obtained under an environment in which there is much visible light, for example. In addition, even under an environment in which there is much infrared light, for example, both of an infrared image and a color image that have high resolution can be obtained.

In particular, in the case of an environment in which there is much infrared light, that is, when the night mode is adopted, a high resolution infrared image having high resolution can be obtained not only in the horizontal direction and the vertical direction but also in the diagonal direction since most pixels on the image have the IR component. Accordingly, it is possible to perform iris recognition and sensing through use of infrared light with high accuracy.

In addition, since the infrared light high frequency image is generated from the high resolution infrared image when the night mode is adopted, a high resolution color image can also be obtained by synthesizing the infrared light high frequency image and the visible light low frequency image.

Note that the example of switching between performing processing for the day mode and performing processing for the night mode on the whole captured image has been described above.

However, a captured image may be divided into a plurality of regions, and in each of those regions, switching may be made between performing processing for the day mode and performing processing for the night mode. In such a case, for an infrared image, for example, interpolation processing may be performed in the region of a low resolution infrared image to match the number of pixels so as to be the same number of pixels as the region of a high resolution infrared image.

In addition, for each image of an infrared image and a color image, an image obtained in the processing for the day mode and an image obtained in the processing for the night mode may be blended for each region of a captured image or for the whole captured image to obtain a final image.

In such a case, the blending ratio between the image obtained in the processing for the day mode and the image obtained in the processing for the night mode may be determined in accordance with the result of comparison between the output level of the G/IR pixel and the output level of the IR pixel in a region of a processing target, for example.

Variations of First Embodiment

<With Regard to Pixel Array of Imaging Unit>

In addition, in the example indicated by the arrow A11 in FIG. 2, the case where the G/IR pixels for obtaining a luminance component are arranged like a checkerboard in order to increase the luminance resolution of a captured image has been described. However, the pixel structure of the imaging unit 21 may be anything as long as infrared light is blocked by pixels that are significantly influenced by the color temperature and do not result from the luminance component.

Figure 10:
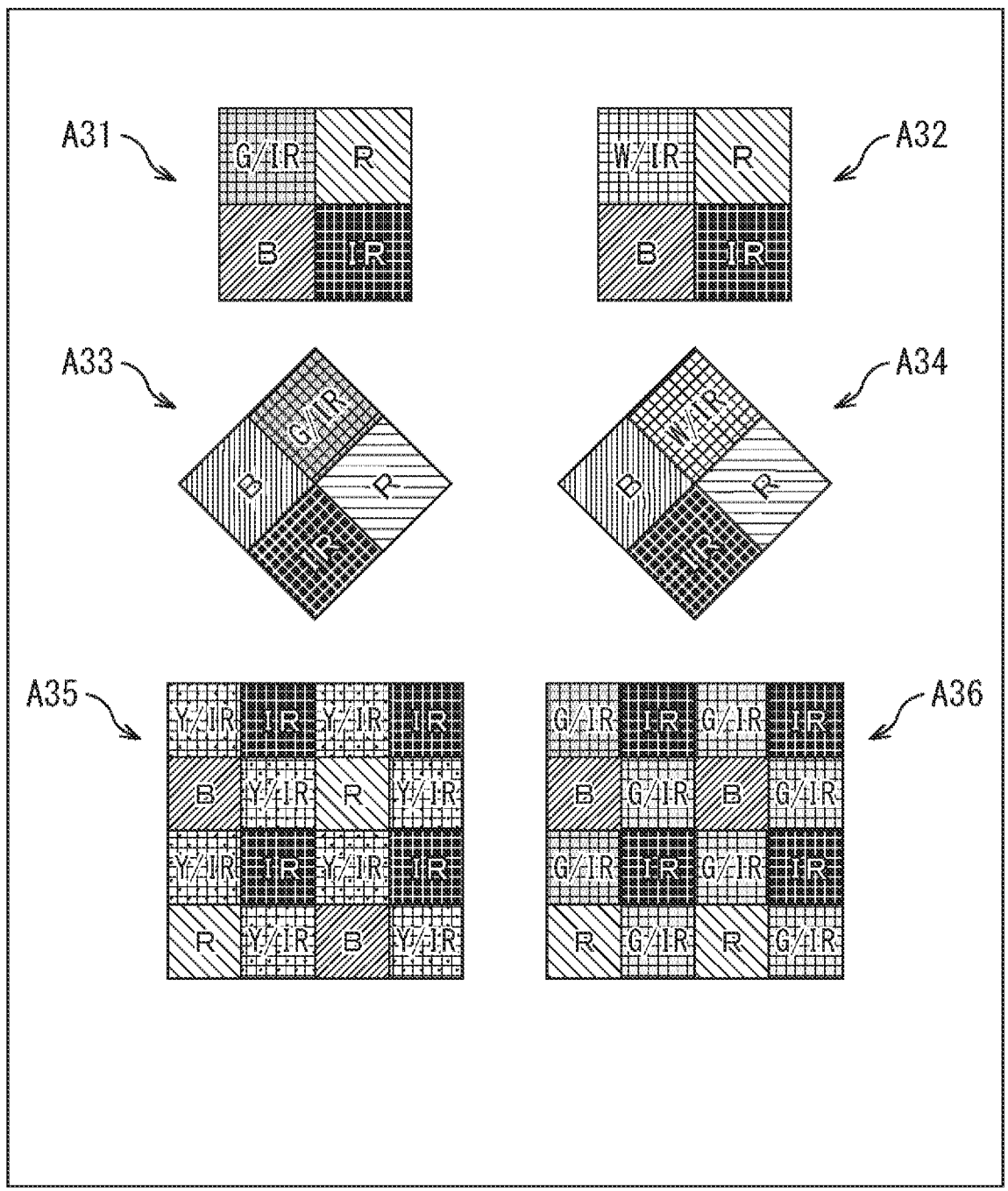
FIG. 10 is a diagram showing an example of a pixel array.

For example, the pixel array of the imaging unit 21 may be an array as shown in FIG. 10. Note that, in FIG. 10, each rectangle represents one pixel, and the characters indicated in those pixels indicate components to be received by the respective pixels.

In particular, the R pixel, the G/IR pixel, the B pixel, the IR pixel, and the W/IR pixel are similar to those of the example shown in FIG. 2. In addition, a pixel denoted by the characters "Y/IR" represent a pixel (hereinafter referred to as a Y/IR pixel as well) that receives a Y (yellow) component of visible light and an infrared light (IR) component.

In an example indicated by an arrow A31, for example, the R pixel, the G/IR pixel, the B pixel, and the IR pixel are provided adjacent to each other, and a plurality of combinations of these four pixels are provided to align on the light receiving surface of the imaging unit 21. Also in this case, an infrared image and a color image can be obtained by processing similar to the example indicated by the arrow A11 in FIG. 2.

In addition, in an example indicated by an arrow A32, the R pixel, the W/IR pixel, the B pixel, and the IR pixel are provided in adjacent to each other, and a plurality of combinations of these four pixels are provided to align on the light receiving surface of the imaging unit 21.

In an example indicated by an arrow A33, the arrangement of the respective pixels on the light receiving surface of the imaging unit 21 is an arrangement obtained by turning the pixel group indicated by the arrow A31 by 45 degrees in the clockwise direction in the drawing.

Similarly, in an example indicated by an arrow A34, the arrangement of the respective pixels on the light receiving surface of the imaging unit 21 is an arrangement obtained by turning the pixel group indicated by the arrow A32 by 45 degrees in the clockwise direction in the drawing.

A pixel array indicated by an arrow A35 is an array obtained by replacing the G/IR pixels in the pixel array indicated by the arrow A11 in FIG. 2 by the Y/IR pixels that receive the Y (yellow) component of visible light and the infrared light (IR) component.

A pixel array indicated by an arrow A36 is an example in which the arrangement of the R pixel and the B pixel is different from the pixel array indicated by the arrow A11 in FIG. 2. In this example, a plurality of R pixels are aligned and arranged in the lateral direction in the drawing with the G/IR pixel interposed in between, and similarly, a plurality of B pixels are aligned and arranged in the lateral direction in the drawing with the G/IR pixel interposed in between.

Figure 11:
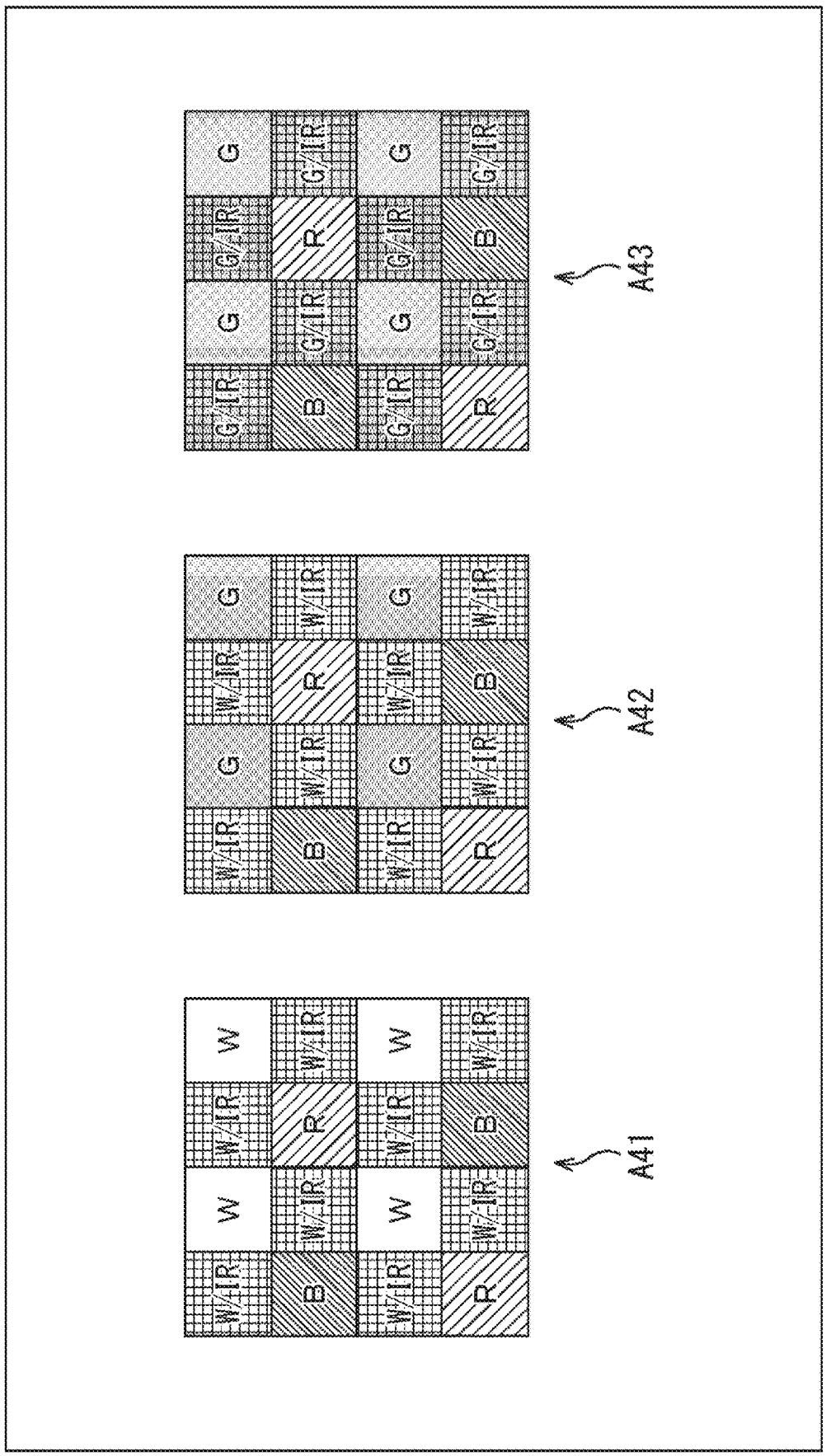
FIG. 11 is a diagram showing an example of a pixel array.

Further, in each pixel arrangement example indicated above, the IR pixels are provided on the light receiving surface of the imaging unit 21. However, a pixel array not provided with the IR pixels may be adopted as shown in FIG. 11, for example. Note that, in FIG. 11, each rectangle represents one pixel, and the characters indicated in those pixels indicate components to be received by the respective pixels.

In particular, the R pixel, the G/IR pixel, the B pixel, and the W/IR pixel are similar to those of the example shown in FIG. 2. In addition, a pixel denoted by the character "W" represents a pixel (hereinafter referred to as a W pixel as well) that only receives a W (white) component of visible light, and a pixel denoted by the character "G" represents a pixel (hereinafter referred to as a G pixel as well) that only receives the G (green) component of visible light.

In the example shown in FIG. 11, the R components, the G components, and the B components, or the W components are assumed as visible light components, and detection comparison with the output of a pixel that includes the IR component and generates a luminance component is performed to obtain a color image of visible light and an infrared image.

A pixel array indicated by an arrow A41, for example, is an array obtained by replacing the IR pixels in the pixel array indicated by the arrow A12 in FIG. 2 by the W pixels that receive the W component of visible light.

In this example, by comparing the pixel value of the W pixel and the average value of the pixel values of four W/IR pixels adjacent to the W pixel on the upper, lower, left, and right sides in the drawing, it is possible to determine whether to adopt the day mode or the night mode. Also in this case, a visible light high frequency image is generated from a visible light component, in particular, the W component in the day mode, for example, and an infrared image is generated from the W/IR pixel in the night mode, and an infrared light high frequency image is further generated from the infrared image.

In addition, a pixel array indicated by an arrow A42, for example, is an array obtained by replacing the W pixels in the pixel array indicated by the arrow A41 by the G pixels that only receive the G component of visible light.

In this example, the W component is generated from the R pixel, the G pixel, and the B pixel, and it is possible to determine whether to adopt the day mode or the night mode by comparing the W component and the pixel value of the W/IR pixel. Also in this case, a visible light high frequency image is generated from a visible light component, in particular, the G component in the day mode, for example, and an infrared image is generated from the W/IR pixel in the night mode, and an infrared light high frequency image is further generated from the infrared image.

Further, a pixel array indicated by an arrow A43, for example, is an array obtained by replacing the W/IR pixels in the pixel array indicated by the arrow A42 by the G/IR pixels.

In this example, by comparing the pixel value of the G pixel and the pixel value of the G/IR pixel, it is possible to determine whether to adopt the day mode or the night mode. Also in this case, a visible light high frequency image is generated from a visible light component, in particular, the G component in the day mode, for example, and an infrared image is generated from the G/IR pixel in the night mode, and an infrared light high frequency image is further generated from the infrared image.

In the examples indicated by these arrow A41 to arrow A43, pixels that only receive visible light components and pixels that receive the IR component are provided in the same number. In addition, in these examples, since the IR component at a position of a pixel that does not receive the IR component is obtained by filtering processing when generating an infrared image, the SN ratio of an image of visible light can be improved, although an increase in resolution of the infrared image cannot be expected as compared with the example shown in FIG. 2.

Incidentally, the above-described series of processes may be performed by hardware or may be performed by software. When the series of processes are performed by software, a program forming the software is installed into a computer. Examples of the computer include a computer that is incorporated in dedicated hardware and a general-purpose personal computer that can perform various types of function by installing various types of program.

Figure 12:
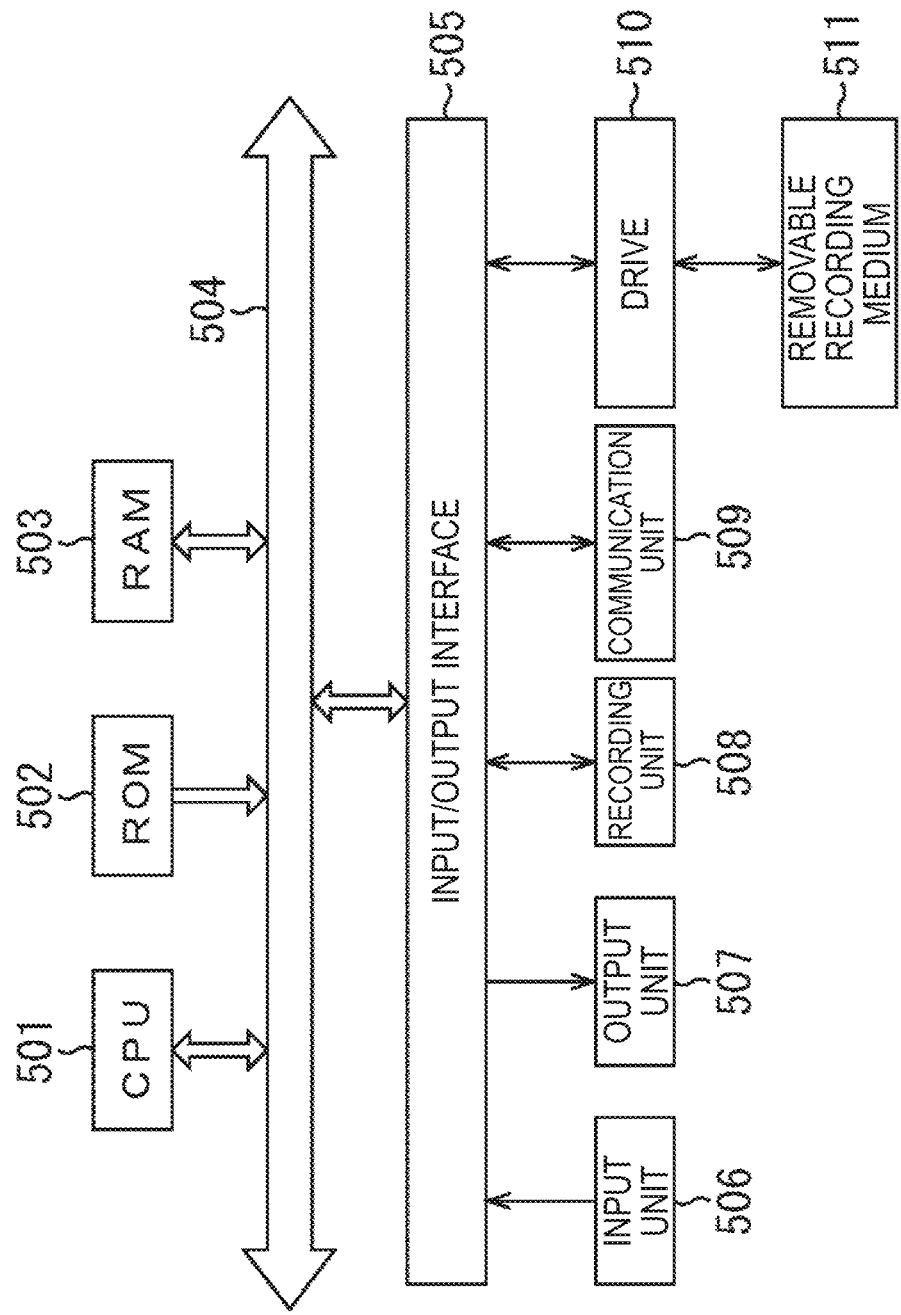
FIG. 12 is a diagram showing a configuration example of a computer.

FIG. 12 is a block diagram illustrating a configuration example of the hardware of a computer that performs the above-described series of processes with a program.

In the computer, a central processing unit (CPU) 501, a read only memory (ROM) 502, and a random access memory (RAM) 503 are mutually connected by a bus 504.

Further, an input/output interface 505 is connected to the bus 504. Connected to the input/output interface 505 are an input unit 506, an output unit 507, a recording unit 508, a communication unit 509, and a drive 510.

The input unit 506 includes a keyboard, a mouse, a microphone, an image sensor, and the like. The output unit 507 includes a display, a speaker, and the like. The recording unit 508 includes a hard disk, a non-volatile memory, and the like. The communication unit 509 includes a network interface, and the like. The drive 510 drives a removable recording medium 511 such as a magnetic disk, an optical disc, a magneto-optical disk, and a semiconductor memory.

In the computer configured as described above, the CPU 501 loads a program that is recorded, for example, in the recording unit 508 onto the RAM 503 via the input/output interface 505 and the bus 504, and executes the program, thereby performing the above-described series of processes.

For example, programs to be executed by the computer (CPU 501) can be recorded and provided in the removable recording medium 511, which is a packaged medium or the like. In addition, programs can be provided via a wired or wireless transmission medium such as a local area network, the Internet, and digital satellite broadcasting.

In the computer, by mounting the removable recording medium 511 onto the drive 510, programs can be installed into the recording unit 508 via the input/output interface 505. Programs can also be received by the communication unit 509 via a wired or wireless transmission medium, and installed into the recording unit 508. In addition, programs can be installed in advance into the ROM 502 or the recording unit 508.

Note that a program executed by the computer may be a program in which processes are chronologically carried out in a time series in the order described herein or may be a program in which processes are carried out in parallel or at necessary timing, such as when the processes are called.

In addition, embodiments of the present disclosure are not limited to the above-described embodiments, and various alterations may occur insofar as they are within the scope of the present disclosure.

For example, the present technology can adopt a configuration of cloud computing, in which a plurality of devices share a single function via a network and perform processes in collaboration.

Furthermore, each step in the above-described flowcharts can be executed by a single device or shared and executed by a plurality of devices.

In addition, when a single step includes a plurality of processes, the plurality of processes included in the single step can be executed by a single device or shared and executed by a plurality of devices.

Additionally, the present technology may also be configured as below.

(1)

An image processing apparatus including:

an extraction unit configured to, from a captured image having a first pixel having a first color component of visible light and an infrared component and a second pixel only having a second color component of visible light that is influenced by a color temperature more significantly than the first color component and less influences a luminance component than the first color component, extract the first pixel to generate an extracted infrared image;

an infrared image generation unit configured to perform interpolation processing on the extracted infrared image to generate an infrared image; and a color image generation unit configured to generate a color image on a basis of a visible light low frequency image having a visible light component obtained from the captured image, and the infrared image.

(2)

The image processing apparatus according to (1), in which the captured image further has a third pixel only having an infrared component, and the extraction unit extracts the first pixel and the third pixel from the captured image to generate the extracted infrared image.

(3)

The image processing apparatus according to (2), in which in a case where an output level of the first pixel and an output level of the third pixel are substantially equal, the infrared image generation unit performs the interpolation processing on the extracted infrared image including the first pixel and the third pixel to generate the infrared image, and in the case where the output level of the first pixel and the output level of the third pixel are substantially equal, the color image generation unit generates the color image on the basis of the visible light low frequency image and the infrared image.

(4)

The image processing apparatus according to (2) or (3), further including:

a white balance adjustment unit configured to perform white balance adjustment on the extracted infrared image, in which the infrared image generation unit performs the interpolation processing on the extracted infrared image having undergone the white balance adjustment to generate the infrared image.

(5)

The image processing apparatus according to any one of (2) to (4), in which the color image generation unit synthesizes the visible light low frequency image obtained by extracting the first pixel and the second pixel from the captured image and an infrared light high frequency image obtained by extracting a high frequency component from the infrared image to generate the color image.

(6)

The image processing apparatus according to any one of (2) to (4), in which the color image generation unit synthesizes the visible light low frequency image obtained by extracting the second pixel from the captured image and the infrared image to generate the color image.

(7)

The image processing apparatus according to any one of (2) to (6), in which a total number of the first pixels and the third pixels on the captured image is larger than a number of the second pixels.

(8)

The image processing apparatus according to any one of (1) to (7), in which the first color component is green, white, or yellow.

(9)

The image processing apparatus according to any one of (1) to (8), in which the second color component is red or blue.

(10)

The image processing apparatus according to any one of (1) to (9), further including:

an imaging unit configured to capture the captured image.

(11)

An image processing method including steps of:

from a captured image having a first pixel having a first color component of visible light and an infrared component and a second pixel only having a second color component of visible light that is influenced by a color temperature more significantly than the first color component and less influences a luminance component than the first color component, extracting the first pixel to generate an extracted infrared image;

performing interpolation processing on the extracted infrared image to generate an infrared image; and generating a color image on a basis of a visible light low frequency image having a visible light component obtained from the captured image, and the infrared image.

(12)

A program causing a computer to execute processing including steps of:

from a captured image having a first pixel having a first color component of visible light and an infrared component and a second pixel only having a second color component of visible light that is influenced by a color temperature more significantly than the first color component and less influences a luminance component than the first color component, extracting the first pixel to generate an extracted infrared image;

performing interpolation processing on the extracted infrared image to generate an infrared image; and generating a color image on a basis of a visible light low frequency image having a visible light component obtained from the captured image, and the infrared image.

(13)

An image sensor including:

a first pixel configured to receive a first color component of visible light and an infrared component; and a second pixel configured to only receive a second color component of visible light that is influenced by a color temperature more significantly than the first color component and less influences a luminance component than the first color component.

(14)

The image sensor according to (13), further including:

a third pixel configured to only receive an infrared component.

(15)

The image sensor according to (14), in which a total number of the first pixels and the third pixels is larger than a number of the second pixels.

(16)

The image sensor according to any one of (13) to (15), in which the first color component is green, white, or yellow.

(17)

The image sensor according to any one of (13) to (16), in which the second color component is red or blue.

REFERENCE SIGNS LIST 11 image processing apparatus
21 imaging unit 22 image processing unit
51 extraction unit
52 visible image processing unit
53 infrared image processing unit
54 color image generation unit
61 detection unit
62 high frequency image generation unit
71 output level calculation unit
72 WB adjustment unit
73 infrared image generation unit
74 high frequency image generation unit

The invention claimed is:

1. An image processing apparatus comprising:
a processing device and a memory containing instructions that, when executed by the processing device, are configured to:
from a captured image having a first pixel configured to receive only a first color component of visible light and to receive an infrared component, wherein the first pixel does not include an infrared blocking filter, and a second pixel configured to receive only a second color component of visible light that is influenced by a color temperature more significantly than the first color component and less influences a luminance component than the first color component, extract the first pixel to generate an extracted infrared image, wherein the second pixel includes an infrared blocking filter;
perform interpolation processing on the extracted infrared image to generate an infrared image; and
generate a color image on a basis of a visible light low frequency image having a visible light component obtained from the captured image, and the infrared image.

2. The image processing apparatus according to claim 1, wherein
the captured image further has a third pixel configured to receive only an infrared component, and
the instructions are configured to extract the first pixel and the third pixel from the captured image to generate the extracted infrared image.

3. The image processing apparatus according to claim 2, wherein
in a case where an output level of the first pixel and an output level of the third pixel are substantially equal, the instructions are configured to perform the interpolation processing on the extracted infrared image including the first pixel and the third pixel to generate the infrared image, and
in the case where the output level of the first pixel and the output level of the third pixel are substantially equal, the instructions are configured to generate the color image on the basis of the visible light low frequency image and the infrared image.

4. The image processing apparatus according to claim 2, wherein the instructions are further configured to:
perform white balance adjustment on the extracted infrared image and to perform the interpolation processing on the extracted infrared image having undergone the white balance adjustment to generate the infrared image.

5. The image processing apparatus according to claim 2, wherein
the instructions are configured to synthesize the visible light low frequency image obtained by extracting the first pixel and the second pixel from the captured image and an infrared light high frequency image obtained by extracting a high frequency component from the infrared image to generate the color image.

6. The image processing apparatus according to claim 2, wherein
the instructions are configured to synthesize the visible light low frequency image obtained by extracting the second pixel from the captured image and the infrared image to generate the color image.

7. The image processing apparatus according to claim 2, wherein
a total number of the first pixels and the third pixels on the captured image is larger than a number of the second pixels.

8. The image processing apparatus according to claim 1, wherein
the first color component is green, white, or yellow.

9. The image processing apparatus according to claim 1, wherein
the second color component is red or blue.

10. The image processing apparatus according to claim 1, further comprising:
an imaging unit configured to capture the captured image.

11. An image processing method comprising:
from a captured image having a first pixel configured to receive only a first color component of visible light and to receive an infrared component, wherein the first pixel does not include an infrared blocking filter, and a second pixel configured to receive only a second color component of visible light that is influenced by a color temperature more significantly than the first color component and less influences a luminance component than the first color component, extracting the first pixel to generate an extracted infrared image, wherein the second pixel includes an infrared blocking filter;
performing interpolation processing on the extracted infrared image to generate an infrared image; and
generating a color image on a basis of a visible light low frequency image having a visible light component obtained from the captured image, and the infrared image.

12. A non-transitory computer readable medium containing instructions that, when executed by a processor, perform an image processing method comprising:
from a captured image having a first pixel configured to receive only a first color component of visible light and to receive an infrared component, wherein the first pixel does not include an infrared blocking filter, and a second pixel configured to receive only a second color component of visible light that is influenced by a color temperature more significantly than the first color component and less influences a luminance component than the first color component, extracting the first pixel to generate an extracted infrared image, wherein the second pixel includes an infrared blocking filter;
performing interpolation processing on the extracted infrared image to generate an infrared image; and
generating a color image on a basis of a visible light low frequency image having a visible light component obtained from the captured image, and the infrared image.

13. An image sensor comprising:
a first pixel configured to receive only a first color component of visible light and to receive an infrared component, wherein the first pixel does not include an infrared blocking filter; and
a second pixel configured to only receive a second color component of visible light that is influenced by a color temperature more significantly than the first color component and less influences a luminance component than the first color component, wherein the second pixel includes an infrared blocking filter.

14. The image sensor according to claim 13, further comprising:
a third pixel configured to only receive an infrared component.

15. The image sensor according to claim 14, wherein
a total number of the first pixels and the third pixels is larger than a number of the second pixels.

16. The image sensor according to claim 13, wherein
the first color component is green, white, or yellow.

17. The image sensor according to claim 13, wherein
the second color component is red or blue.

* * * * *